(12) United States Patent
Shteynberg et al.

(10) Patent No.: US 8,441,210 B2
(45) Date of Patent: May 14, 2013

(54) ADAPTIVE CURRENT REGULATION FOR SOLID STATE LIGHTING

(75) Inventors: Anatoly Shteynberg, San Jose, CA (US); Harry Rodriguez, Gilroy, CA (US); Bradley M. Lehman, Belmont, MA (US); Dongsheng Zhou, San Jose, CA (US)

(73) Assignee: Point Somee Limited Liability Company, Dover, DE (US)

( * ) Notice: Subject to any disclaimer, the term of this patent is extended or adjusted under 35 U.S.C. 154(b) by 555 days.

(21) Appl. No.: 12/639,255

(22) Filed: Dec. 16, 2009

(65) Prior Publication Data

US 2010/0213859 A1   Aug. 26, 2010

Related U.S. Application Data

(63) Continuation-in-part of application No. 11/655,558, filed on Jan. 19, 2007, now Pat. No. 7,656,103.

(60) Provisional application No. 60/760,157, filed on Jan. 20, 2006.

(51) Int. Cl.
*H05B 37/02* (2006.01)

(52) U.S. Cl.
USPC .................. 315/308; 315/209 R; 315/291

(58) Field of Classification Search .............. 315/209 R, 315/224, 225, 227 R, 291, 307, 308
See application file for complete search history.

(56) References Cited

U.S. PATENT DOCUMENTS

| | | | |
|---|---|---|---|
| 3,283,252 A | 11/1966 | Mead, Jr. | |
| 5,748,042 A | 5/1998 | Norris | |
| 6,011,357 A | 1/2000 | Gradzki | |
| 6,091,614 A | 7/2000 | Malenfant | |
| 6,150,802 A | 11/2000 | Andrews | |
| 6,153,985 A | 11/2000 | Grossman | |
| 6,175,195 B1 * | 1/2001 | Janczak et al. | 315/194 |
| 6,198,611 B1 | 3/2001 | Macbeth | |
| 6,304,464 B1 | 10/2001 | Jacobs | |
| 6,400,102 B1 | 6/2002 | Ghanem | |
| 6,441,558 B1 | 8/2002 | Muthu | |
| 6,515,434 B1 | 2/2003 | Biebl | |

(Continued)

OTHER PUBLICATIONS

International Search Report mailed Apr. 26, 2011, issued in International Application No. PCT/US2010/060580, filed Dec. 5, 2010, 3 pages.

(Continued)

*Primary Examiner* — Jimmy Vu

(74) *Attorney, Agent, or Firm* — Christensen O'Connor Johnson Kindness PLLC

(57) ABSTRACT

Exemplary embodiments provide an apparatus, system and method for power conversion to provide power to solid state lighting, and which may be coupled to a first switch, such as a dimmer switch. An exemplary system for power conversion comprises: a switching power supply comprising a second, power switch; solid state lighting coupled to the switching power supply; a voltage sensor; a current sensor; a memory; a first adaptive interface circuit to provide a resistive impedance to the first switch and conduct current from the first switch in a default mode; a second adaptive interface circuit to create a resonant process when the first switch turns on; and a controller to modulate the second adaptive interface circuit when the first switch turns on to provide a current path during the resonant process of the switching power supply.

25 Claims, 20 Drawing Sheets

U.S. PATENT DOCUMENTS

| | | |
|---|---|---|
| 6,577,072 B2 | 6/2003 | Saito |
| 6,577,512 B2 | 6/2003 | Tripathi |
| 6,597,127 B2 | 7/2003 | Takahashi |
| 6,628,089 B2 | 9/2003 | Suomi |
| 6,747,420 B2 | 6/2004 | Barth |
| 6,781,351 B2 | 8/2004 | Mednik |
| 6,798,152 B2 | 9/2004 | Rooke |
| 6,809,498 B2 | 10/2004 | Nakamura |
| 6,870,327 B2 | 3/2005 | Takahashi |
| 6,977,472 B2 | 12/2005 | Matsubayashi |
| 7,119,494 B2 * | 10/2006 | Hui et al. ............... 315/219 |
| 7,126,290 B2 | 10/2006 | Elliott |
| 7,140,742 B2 | 11/2006 | Pohlert |
| 7,279,878 B2 | 10/2007 | Ootani |
| 7,394,231 B2 | 7/2008 | Flatness |
| 7,436,163 B2 | 10/2008 | Katoh |
| 7,656,103 B2 | 2/2010 | Shteynberg |
| 2003/0020442 A1 | 1/2003 | Hwang |
| 2004/0207337 A1 | 10/2004 | Fischer |
| 2005/0168168 A1 | 8/2005 | Elliott |
| 2005/0253533 A1 | 11/2005 | Lys et al. |
| 2006/0132061 A1 | 6/2006 | McCormick |
| 2007/0182338 A1 | 8/2007 | Shteynberg |
| 2007/0182347 A1 | 8/2007 | Shteynberg |
| 2007/0267984 A1 | 11/2007 | Peng |
| 2009/0200953 A1 | 8/2009 | King |
| 2011/0121754 A1 | 5/2011 | Shteynberg |
| 2011/0309759 A1 | 12/2011 | Shteynberg |

OTHER PUBLICATIONS

"AND8136/D: Offline LED Driver," Semiconductor Components Industries, LLC, Phoenix, Mar. 2005—Rev. 1, 6 pages.

"LT1932: Constant-Current DC/DC LED Driver in ThinSOT," Linear Technology Corporation, Milpitas, Calif., 2001, 16 pages.

Mednik, A., "Automotive LED Lighting Needs Special Drivers," Power Electronics Technology, Aug. 2005, pp. 22-28.

"NCP5006: Compact Backlight Led Boost Driver," Semiconductor Components Industries, LLC, Phoenix, Mar. 2006—Rev. 2, 24-page datasheet.

Walding, C., "AND8137/D: High Current LED—Isolated Low Voltage AC Drive Application Note," Semiconductor Components Industries, LLC, Denver, Oct. 2003, 12 pages.

Walding, C., "AND8146/D: High Current LED—Capacitive Drop Drive Application Note," Semiconductor Components Industries, LLC, Denver, Feb. 2004, 14 pages.

Office Action mailed Oct. 24, 2012, in U.S. Appl. No. 12/778,767, filed May 12, 2010, 14 pages.

* cited by examiner

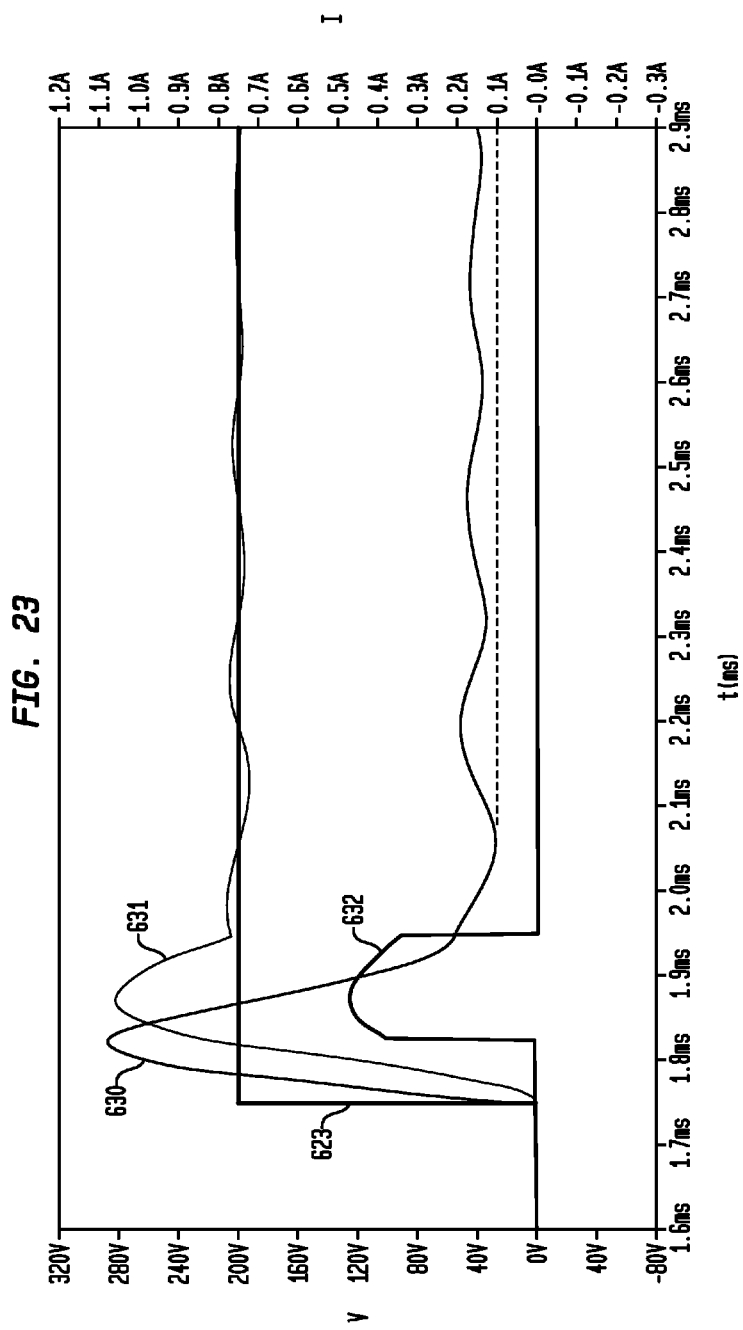

ADAPTIVE CURRENT REGULATION FOR SOLID STATE LIGHTING

CROSS-REFERENCE TO RELATED APPLICATIONS

This application is related to and is a continuation-in-part of U.S. patent application Ser. No. 11/655,558, filed Jan. 19, 2007, inventors Anatoly Shteynberg et al., entitled "Impedance Matching Circuit for Current Regulation of Solid State Lighting," now U.S. Pat. No. 7,656,103, which claims the benefit of U.S. Provisional Patent Application No. 60/760,157, filed Jan. 20, 2006, inventors Anatoly Shteynberg et al., entitled "Off-Line LED Driver with Phase Modulation," both of which are commonly assigned herewith, the contents of which are incorporated herein by reference with the same full force and effect as if set forth in their entireties herein, and with priority claimed for all commonly disclosed subject matter.

FIELD

The present disclosure in general is related to power conversion, and more specifically, to a system, apparatus, and method for supplying power to solid state lighting devices, such as for providing power to light-emitting diodes ("LEDs").

BACKGROUND

A wide variety of off-line power supplies for providing power to LEDs are known. Many of these power supplies (i.e., drivers) are effectively incompatible with the existing lighting system infrastructure, such as the lighting systems typically utilized for incandescent or fluorescent lighting, such as infrastructure generally utilizing phase-modulating "dimmer" switches to alter the brightness or intensity of light output from incandescent bulbs. Accordingly, replacement of incandescent lamps by LEDs is facing a challenge: Either do a complete rewiring of the lighting infrastructure, which is expensive and unlikely to occur, or develop new LED drivers compatible with commercially available and already installed dimmer switches. In addition, as many incandescent or other lamps will likely remain in any given lighting environment, it would be highly desirable to enable LEDs and incandescent lamps to be able to operate in parallel and under common control.

Incandescent lamps and LEDs can be connected to a common lamp power bus, with the light output intensity controlled using a composite waveform, having two power components. This is complicated, requires excessively many components to implement, and is not particularly oriented to AC (alternating current) utility lighting.

An off-line LED driver with a power factor correction capability has been described. When coupled with a dimmer, however, its LED regulation is poor and it does not completely support stable operation of the dimmer in the full range of output loads, specifically when both incandescent and LED lamps are being used in parallel.

FIG. 1 is a circuit diagram of a prior art current regulator 50 connected to a dimmer switch 75 which provides phase modulation. FIG. 2 is a circuit diagram of such a prior art (forward) dimmer switch 75. The time constant of resistor 76 (RI) and capacitor 77 (C1) control the firing angle "α" (illustrated in FIG. 3) of the triac 80. The diac 85 is used to maximize symmetry between the firing angle for the positive and negative half cycles of the input AC line voltage (35). Capacitor 45 (C2) and inductor 40 (L1) form a low pass filter to help reduce noise generated by the dimmer switch 75. A triac 80 is a switching device effectively equivalent to reverse parallel Silicon Controlled Rectifiers (SCRs), sharing a common gate. The single SCR is a gate-controlled semiconductor that behaves like a diode when turned on. A signal at the gate (70) is used to turn the triac 80 on, and the load current is used to hold or keep the triac 80 on. Thus, the gate signal cannot turn an SCR off and it will remain on until the load current goes to zero. A triac 80 behaves like an SCR but conducts in both directions. Triacs have different turn-on thresholds for positive and negative conduction. This difference is usually minimized by using a diac 85 coupled to the gate 70 of the triac 80 to control the turn-on voltage of the triac 80.

Triacs 80 also have minimum latching and holding currents. The latching current is the minimum current to turn on the triac 80 when given a sufficient gate pulse. The holding current is the minimum current to hold the triac 80 in an on-state once conducting. When the current drops below this holding current, the triac 80 will turn off. The latching current is typically higher than the holding current. For dimmer switches that use triacs, capable of switching 3 to 8 A for example, the holding and latching currents are on the order of 10 mA to about 70 mA, also for example and without limitation.

The firing angle ($\alpha$) of the triac 80 controls the delay from the zero crossing of the AC line, and is theoretically limited between 0° and 180°, with 0° equating to full power and 180° to no power delivered to the load, with an exemplary phase-modulated output voltage illustrated in FIG. 3 (as a "chopped" sinusoid). A typical dimmer switch, for example, may have minimum and maximum $\alpha$ values of about 25° and 155°, respectively, allowing about 98% to 2% of power to flow to the load compared to operation directly from the AC mains (AC line voltage (35)). Similarly, a reverse-phase modulated dimmer will provide an output voltage across a resistive load as illustrated in FIG. 4, which provides energy to the load at the beginning of each cycle, such as from 0° to 90°, for example, with no energy delivered in the latter part of each cycle (illustrated as interval $\beta$).

Referring to FIG. 2, the firing angle $\alpha$ is determined by the RC time constant of capacitor 77 (C1), resistor 76 (R1), and the impedance of the load, such as an incandescent bulb or an LED driver circuit ($Z_{LOAD}$ 81). In typical dimming applications, $Z_{LOAD}$ will be orders of magnitude lower than RI and resistive, thus will not affect the firing angle appreciably. When the load is comparable to RI or is not resistive, however, the firing angle and behavior of the dimmer switch can change dramatically.

Typical prior art, off-line AC/DC converters that drive LEDs using phase modulation from a dimmer switch have several problems associated with providing a quality drive to LEDs, such as: (1) phase modulation from a dimmer switch can produce a low frequency (about 120 Hz) in the optical output, referred to as "flicker," which can be detected by a human eye or otherwise create a reaction in people to the oscillating light; (2) filtering the input voltage may require quite a substantial value of the input capacitor, compromising both the size of the converter and its useful life; (3) when the triac 80 is turned on, a large inrush current may be created, due to a low impedance of the input filter, which may damage elements of both the dimmer switch 75 and any LED driver; and (4) power management controllers are typically not designed to operate in an environment having phase modulation of input voltage and could malfunction.

Accordingly, a need remains for an LED driver circuit which can operate consistently with a typical or standard, forward or reverse, phase-modulating dimmer switch of the existing lighting infrastructure and avoid the problems discussed above, while providing the environmental and energy-saving benefits of LED lighting. Such an LED driver circuit should be able to be controlled by standard switches of the existing lighting infrastructure to provide the same regulated brightness, for example, for productivity, flexibility, aesthetics, ambience, and energy savings. An exemplary LED driver circuit should be able to operate not only alone, but also in parallel with other types of lighting, such as incandescent, compact fluorescent or other lighting, and be controllable by the same switches, for example, dimmer switches or other adaptive or programmable switches used with such incandescent or other lighting. An exemplary LED driver circuit should also be operable within the existing lighting infrastructure, without the need for re-wiring or other retrofitting.

SUMMARY

The exemplary embodiments described herein provide numerous advantages. The exemplary embodiments allow for solid state lighting, such as LEDs, to be utilized with the currently existing lighting infrastructure, including Edison sockets, and to be controlled by any of a variety of switches, such as phase-modulating dimmer switches, which would otherwise cause significant operation problems for conventional switching power supplies or current regulators. The exemplary embodiments further allow for sophisticated control of the output brightness or intensity of such solid state lighting, and may be implemented using fewer and comparatively lower cost components. In addition, the exemplary embodiments may be utilized for stand-alone solid state lighting systems, or may be utilized in parallel with other types of existing lighting systems, such as incandescent lamps.

Exemplary embodiments described herein not only recognize and accommodate various states of switches, such as phase-modulating dimmer switches, but further utilize a novel insight to also concurrently recognize and accommodate various states of a switching power supply, such that both a phase-modulating dimmer switch and a switching power supply operate together, seamlessly and with substantial stability. More particularly, the exemplary embodiments recognize and accommodate at least three states of a phase-modulating dimmer switch, namely, a first state in which the dimmer switch is not conducting but during which a triggering capacitor (C1, 77) is charging; a second state in which the dimmer switch has turned on and requires a latching current; and a third state in which the dimmer switch is fully conducting and requires a holding current. Concurrently, in combination with the states of the switch, the exemplary embodiments recognize and accommodate at least three states, and in various embodiments four states, of a switching power supply, namely, a first, start-up state of the switching power supply, during which it generates its power supply ($V_{CC}$ voltage level); a second, gradual (graduated or "soft") start state of the switching power supply, during which it ramps up its provision of power to a load (such as LEDs) (e.g., through pulse width modulation ("PWM") switching) from start-up to a full operational mode; a third state, during which the switching power supply is in a full operational mode; and an optional fourth state, during which the switching power supply may experience an abnormal or atypical operation and enter a protective operating mode. For each combination of states of the switch (e.g., dimmer switch) and switching power supply, using corresponding criteria for stable operation, the exemplary embodiments provide a substantially matching electrical environment to meet such criteria for stable operation of both the switch and the switching power supply, enabling seamless and stable operation of both components. In various exemplary embodiments, the same type of substantially matching electrical environment may be utilized for multiple combinations of states, and in other instances, other types of substantially matching electrical environments will be utilized for a selected combination of states of the switch and switching power supply.

Exemplary embodiments described herein provide a method of interfacing a switching power supply to a first switch coupled to an alternating current (AC) power source for providing power to solid state lighting. In various embodiments, the first switch is a forward or reverse phase-modulated dimmer switch. An exemplary method comprises: sensing an input current level; sensing an input voltage level; using a first adaptive interface circuit, providing a resistive impedance to the first switch and conducting current from the first switch in a default mode; and using a second adaptive interface circuit, when the first switch turns on, creating a resonant process and providing a current path during the resonant process of the switching power supply.

In an exemplary embodiment, the method may further comprise: using the second adaptive interface circuit to modulate a current of the first switch during the resonant process of the switching power supply; and/or using a third adaptive interface circuit to modulate a current of the first switch during the resonant process of the switching power supply; and/or using the first adaptive interface circuit to conduct current during a start-up state or a gradual start state of the switching power supply; and/or using the first adaptive interface circuit to conduct current during charging of a trigger capacitor of the first switch, during turn on of the first switch, and during conduction of the first switch.

In various exemplary embodiments, the step of providing a resistive impedance may further comprise: switching the first adaptive interface circuit to provide a constant resistive impedance to the first switch; and/or modulating the first adaptive interface circuit to provide a variable resistive impedance to the first switch; and/or building an operational voltage, and when the operational voltage has reached a predetermined level, modulating the first adaptive interface circuit and transitioning to a gradual start of the switching power supply asynchronously to the state of the first switch.

In various exemplary embodiments, the step of providing a current path during the resonant process may further comprise: determining a peak input current level; and switching a resistive impedance to create the current path. In other various exemplary embodiments, the step of providing a current path during the resonant process may further comprise: determining a peak input current level; and modulating a switched, resistive impedance to create the current path.

In an exemplary embodiment, the method may further comprise: during a full power mode of the switching power supply and during charging of a trigger capacitor of the first switch, operating the switching power supply at a one-hundred percent duty cycle or in a DC mode. In another exemplary embodiment, the method may further comprise: during a full power mode of the switching power supply and during turning on of the first switch, operating the switching power supply at a substantially maximum instantaneous power for a predetermined period of time.

In various exemplary embodiments, the second adaptive interface circuit comprises an inductor in parallel with a resistor, and the method may further comprise: during a full power mode of the switching power supply and during turning on of the first switch, operating the switching power supply at a substantially maximum instantaneous power until the inductor has substantially discharged.

Also in various exemplary embodiments, the method may further comprise: using the second adaptive interface circuit to conduct current during a full operational power state of the switching power supply; and/or adjusting a minimum power from the first switch during a gradual start phase of the switching power supply.

In various exemplary embodiments, the second adaptive interface circuit further comprises a switchable resistive impedance, and the method may further comprise: using the second adaptive interface circuit to provide a current path during a start-up phase of the switching power supply, during a gradual start up of the switching power supply, or during a full operational mode of the switching power supply.

In an exemplary embodiment, the method may further comprise: using an operational voltage bootstrap circuit coupled to the switching power supply to generate an operational voltage. The first adaptive interface circuit may further comprise the operational voltage bootstrap circuit.

In various exemplary embodiments, the method may further comprise: determining a maximum duty cycle corresponding to the sensed input voltage level; providing a pulse width modulation operating mode for the switching power supply using a switching duty cycle less than the maximum duty cycle; and when the duty cycle is within a predetermined range of the maximum duty cycle, providing a current pulse operating mode for the switching power supply. In various exemplary embodiments, the method may further comprise: determining or obtaining from a memory a maximum duty cycle corresponding to the sensed input voltage level; and/or determining or varying the duty cycle to provide a predetermined or selected average or peak output current level; and/or determining a peak output current level up to a maximum volt-seconds parameter.

In an exemplary embodiment, the method may further comprise: detecting a malfunction of the first switch. For example, the method may detect the malfunction by determining at least two input voltage peaks or two input voltage zero crossings during a half-cycle of the AC power source.

Other exemplary embodiments provide a system for power conversion, with the system couplable to a first switch (such as a phase-modulated dimmer switch) coupled to an alternating current (AC) power source, and with the exemplary system comprising: a switching power supply comprising a second power switch; solid state lighting coupled to the switching power supply; a voltage sensor; a current sensor; a memory; a first adaptive interface circuit comprising a resistive impedance to conduct current from the first switch in a default mode; a second adaptive interface circuit to create a resonant process when the first switch turns on; and a controller coupled to the voltage sensor, to the current sensor, to the memory, to the second switch, to the first adaptive interface circuit and to the second adaptive interface circuit, and when the first switch turns on, the controller to modulate the second adaptive interface circuit to provide a current path during the resonant process of the switching power supply.

In various exemplary embodiments, the controller further is to modulate the second adaptive interface circuit to modulate a current of the first switch during the resonant process of the switching power supply. In an exemplary embodiment, the system may further comprise: a third adaptive interface circuit to modulate a current of the first switch during the resonant process of the switching power supply.

In various exemplary embodiments, the controller further is to use the first adaptive interface circuit to conduct current during a start-up state or a gradual start state of the switching power supply; and/or use the first adaptive interface circuit to conduct current during charging of a trigger capacitor of the first switch, during turn on of the first switch, and during conduction of the first switch; and/or switch the first adaptive interface circuit to provide a constant resistive impedance to the first switch; and/or modulate the first adaptive interface circuit to provide a variable resistive impedance to the first switch.

In an exemplary embodiment, when an operational voltage has reached a predetermined level, the controller further may modulate the first adaptive interface circuit and transition to a gradual start of the switching power supply asynchronously to the state of the first switch. In various exemplary embodiments, the second adaptive interface circuit comprises a resistive impedance, wherein the controller further may determine a peak input current level, and when the peak input current level has been reached, the controller further is to switch the resistive impedance to create the current path. In other various exemplary embodiments, the second adaptive interface circuit comprises a switched resistive impedance, wherein the controller further may determine a peak input current level, and when the peak input current level has been reached, the controller further is to modulate the switched, resistive impedance to create the current path.

In an exemplary embodiment, during a full power mode of the switching power supply and during charging of a trigger capacitor of the first switch, the controller further is to operate the switching power supply at a one-hundred percent duty cycle or in a DC mode; and/or during a full power mode of the switching power supply and during turning on of the first switch, the controller further is to operate the switching power supply at a substantially maximum instantaneous power for a predetermined period of time. In another exemplary embodiment, the second adaptive interface circuit comprises an inductor in parallel with a resistor, and wherein during a full power mode of the switching power supply and during turning on of the first switch, the controller further is to operate the switching power supply at a substantially maximum instantaneous power until the inductor has substantially discharged.

In various exemplary embodiments, the controller further may use the second adaptive interface circuit to conduct current during a full operational power state of the switching power supply. In another exemplary embodiment, the controller further may adjust a minimum power from the first switch during a gradual start phase of the switching power supply. In various exemplary embodiments, wherein the second adaptive interface circuit further comprises a switchable resistive impedance, and wherein the controller further may use the second adaptive interface circuit to provide a current path during a start-up phase of the switching power supply, during a gradual start up of the switching power supply, or during a full operational mode of the switching power supply.

In another exemplary embodiment, the system further comprises: an operational voltage bootstrap circuit coupled to the switching power supply to generate an operational voltage. In an exemplary embodiment, the first adaptive interface circuit further comprises the operational voltage bootstrap circuit.

In various exemplary embodiments, the controller further may determine a maximum duty cycle corresponding to the sensed input voltage level; provide a pulse width modulation operating mode for the switching power supply using a switching duty cycle less than the maximum duty cycle; and when the duty cycle is within a predetermined range of the maximum duty cycle, provide a current pulse operating mode for the switching power supply. In various exemplary embodiments, the controller further may determine or obtain from a memory a maximum duty cycle corresponding to the sensed input voltage level; and/or may determine or vary the duty cycle to provide a predetermined or selected average or peak output current level. In an exemplary embodiment, the controller further may determine a peak output current level up to a maximum volt-seconds parameter.

In various exemplary embodiments, the controller further may detect a malfunction of the first switch, for example, by determining at least two input voltage peaks or two input voltage zero crossings during a half-cycle of the AC power source.

In an exemplary embodiment, the first adaptive interface circuit may comprise: a first resistor; a transistor coupled in series to the first resistor, the transistor having a base or having a gate coupled to the controller; and a second resistor coupled to the base or to the gate of the transistor.

In another exemplary embodiment, the first adaptive interface circuit may comprise: a first resistor; a transistor coupled in series to the first resistor, the transistor having a base or having a gate coupled to the controller; a second resistor coupled to a source or an emitter of the transistor; and a zener diode coupled to the base or gate of the transistor and coupled to the second resistor.

In an exemplary embodiment, the second adaptive interface circuit may comprise: an inductor; and a resistor coupled in parallel to the inductor. In another exemplary embodiment, the second adaptive interface circuit may comprise: an inductor; a first resistor coupled to the inductor; a transistor having a base or a gate coupled to the first resistor. In another exemplary embodiment, the second adaptive interface circuit may further comprise: a second resistor coupled to the inductor and coupled to a collector or drain of the transistor; a first zener diode coupled to an emitter or source of the transistor; and a second diode coupled to the inductor and to the first zener diode. In another exemplary embodiment, the second adaptive interface circuit may comprise: an inductor; a first resistor; a differentiator; a one shot circuit coupled to an output of the differentiator; and a transistor coupled in series to the first resistor and further having a gate or base coupled to an output of the one shot circuit.

In various exemplary embodiments, the solid state lighting is one or more light-emitting diodes. The switching power supply may have any configuration, such as having a non-isolated or an isolated flyback configuration. The system may have a form factor compatible with an A19 standard, such as to fit within an Edison socket. The system may be couplable through a rectifier to the first switch. The system may be couplable through a rectifier and an inductor to the first switch.

In another exemplary embodiment, an apparatus is provided for power conversion, the apparatus couplable to a first, phase-modulated dimmer switch coupled to an alternating current (AC) power source, the apparatus couplable to a solid state lighting, and with the exemplary apparatus comprising: a switching power supply comprising a second power switch; a voltage sensor; a current sensor; a memory; a first adaptive interface circuit comprising a resistive impedance to conduct current from the first switch in a default mode; a second adaptive interface circuit to create a resonant process when the first switch turns on; and a controller coupled to the voltage sensor, to the current sensor, to the memory, to the second switch, to the first adaptive interface circuit and to the second adaptive interface circuit, and when the first switch turns on, the controller to modulate the second adaptive interface circuit to provide a current path and to modulate a current of the first switch during the resonant process of the switching power supply.

In another exemplary embodiment, a system is provided for power conversion, the system having a form factor compatible with an A19 standard, the system couplable to a phase-modulating dimmer switch coupled to an alternating current (AC) power source, and with the exemplary system comprising: a switching power supply comprising a power switch; at least one light-emitting diode coupled to the switching power supply; a voltage sensor to sense an input voltage level; a first adaptive interface circuit to conduct current from the dimmer switch in a default mode, the first adaptive interface circuit further providing a substantially matching impedance to the dimmer switch; a second adaptive interface circuit to create a resonant process of the switching power supply and to provide a current path during the resonant process of the switching power supply; a memory; and a controller coupled to the first voltage sensor, to the memory and to the power switch, the controller to provide a pulse width modulation operating mode using a duty cycle less than a maximum duty cycle, and when the duty cycle is within a predetermined range of the maximum duty cycle, to provide a current pulse operating mode.

Numerous other advantages and features will become readily apparent from the following detailed description, from the claims, and from the accompanying drawings.

BRIEF DESCRIPTION OF THE DRAWINGS

Various objects, features, and advantages will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations, or variations of a selected component embodiment in the various views, in which:

FIG. 23 is a graphical diagram illustrating exemplary, modeled transient voltage and current waveforms for a seventh exemplary apparatus embodiment, a seventh exemplary system embodiment, and a seventh exemplary adaptive interface embodiment in accordance with the teachings of the present disclosure.

DETAILED DESCRIPTION

Figure 1:
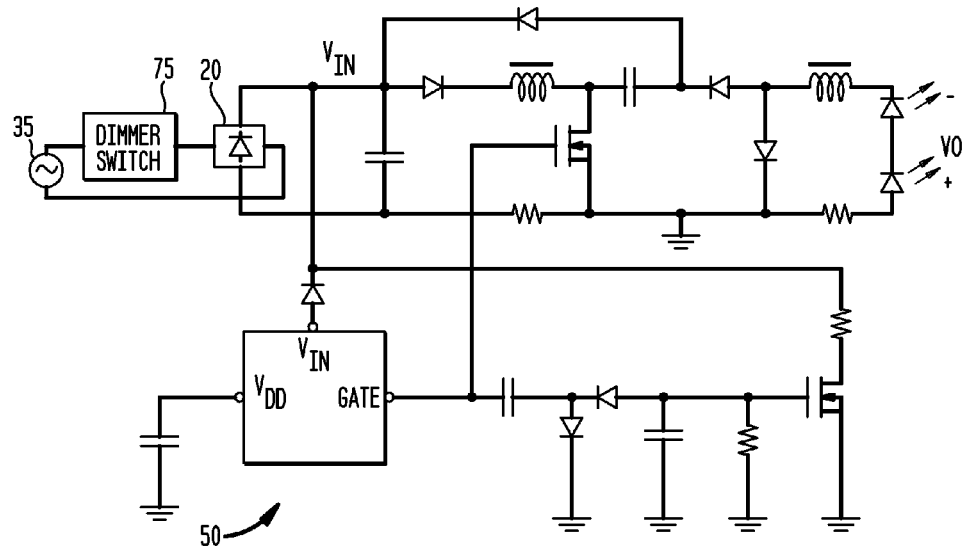
FIG. 1 is a circuit diagram illustrating a prior art current regulator.

The present disclosure is not intended to limit the invention to the specific embodiments illustrated. In this respect, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 5:
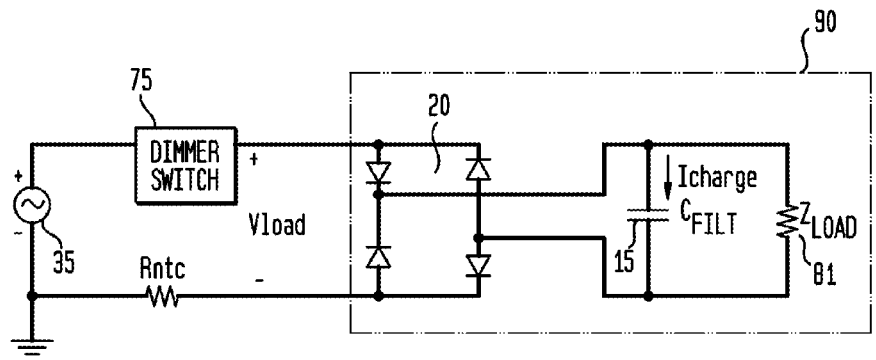
FIG. 5 is a high-level block and circuit diagram illustrating a generalized prior art current regulator (or converter)

As mentioned above, prior art LED driver circuits are often problematic when utilized with conventional dimmer switches 75, causing problems such as perceptible flicker and large inrush currents. For example, as illustrated in FIG. 5, a switching off-line LED driver 90 typically includes a full wave rectifier 20 with a capacitive filter 15, which allows current to flow to the filter capacitor ($C_{FILT}$) 15, when the input voltage is greater than the voltage across the capacitor. The inrush current to the capacitor is limited by the resistance in series with the capacitor. Under normal operating conditions, there may be a Negative Temperature Coefficient resistor (NTC) or thermistor in series with the capacitor to minimize inrush current during initial charging. This resistance will be significantly reduced during operation, allowing for fast capacitor charging. This circuit will continuously peak charge the capacitor to the peak voltage of the input waveform, 169 V DC for standard 120 V AC line voltage.

Figure 2:
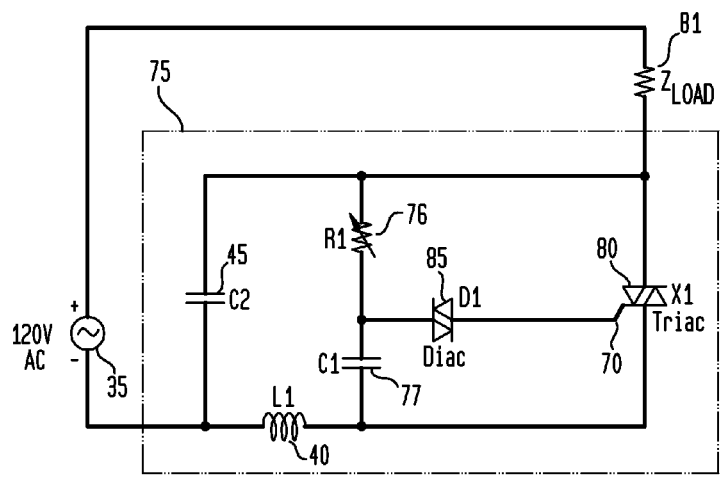
FIG. 2 is a circuit diagram illustrating a representative prior art dimmer switch.
Figure 3:
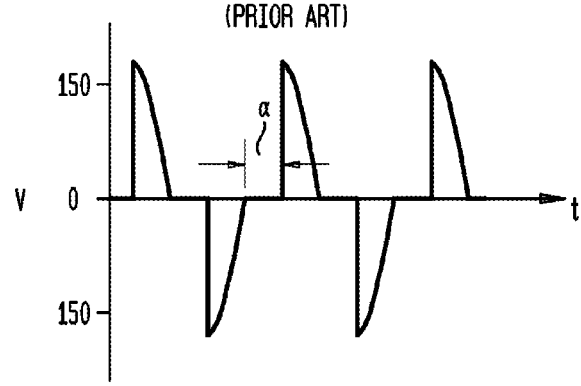
FIG. 3 is a graphical diagram illustrating the phase-modulated output voltage from a standard phase-modulated dimmer switch.
Figure 4:
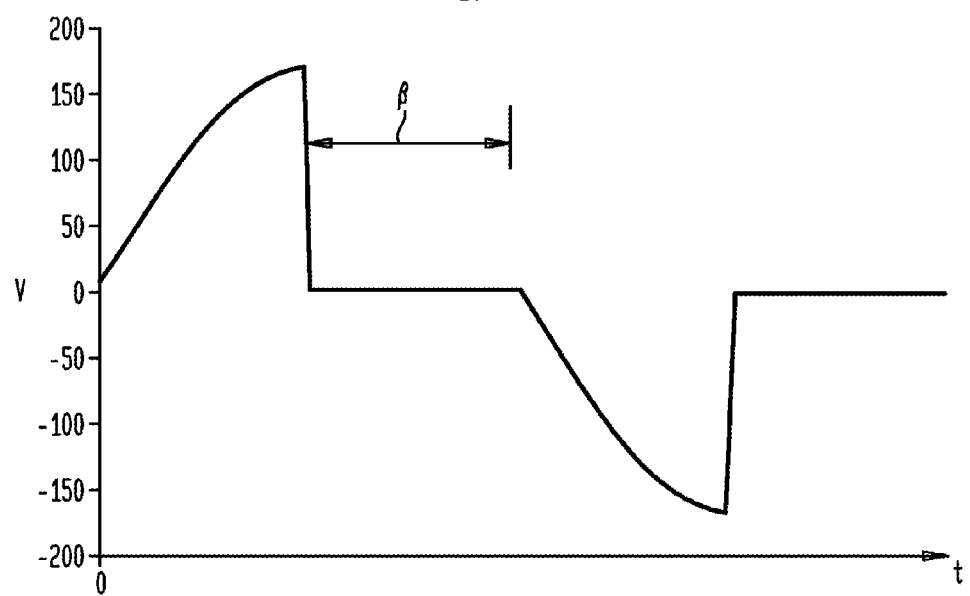
FIG. 4 is a graphical diagram illustrating the phase-modulated output voltage from a reverse phase-modulated dimmer switch.
Figure 6:
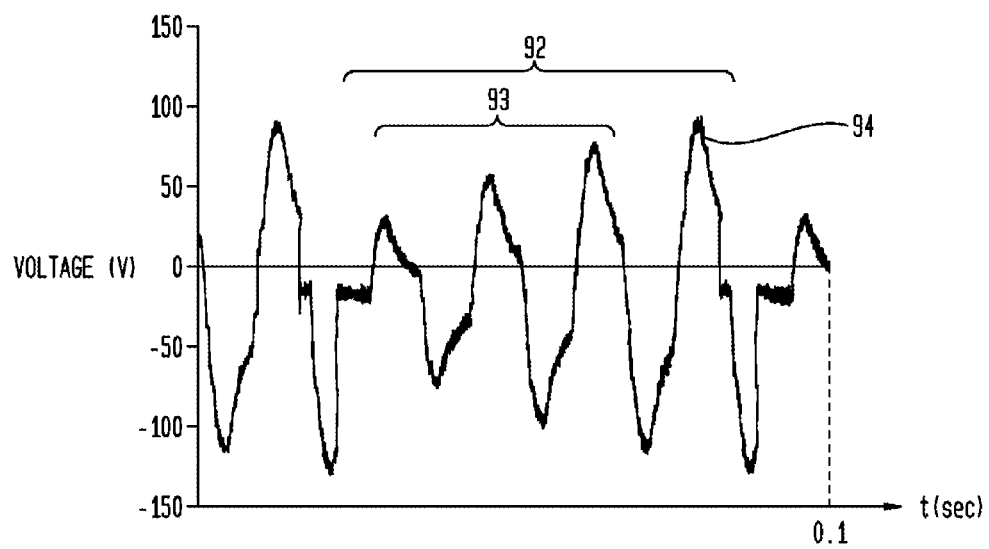
FIG. 6 is a graphical diagram illustrating a triac voltage having a subharmonic startup frequency in a prior art current regulator coupled to a dimmer switch which causes perceptible LED flicker.

When used with a dimmer switch 75, however, the charging current of the filter capacitor is limited by the dimming resistance R1 (of resistor 76) and is $I_{CHARGE}=(V_{IN}-V_{LOAD}-V_{C1})/R1$ (FIGS. 2 and 5). The voltage across the filter capacitor can be approximated to a DC voltage source due to the large difference between C1 (77) and $C_{FILT}$ (15). The charging current of the filter capacitor is also the charging current for C1, which controls the firing angle of the dimmer. The charging current for C1 will be decreased from normal dimmer operation due to the large voltage drop ($V_{C1}$) across the filter capacitor 15. For large values of $V_{C1}$, the current into C1 will be small and thus slowly charge. As a consequence, and as illustrated in FIG. 6, the small charging current may not be enough to charge C1 to the diac 85 breakover voltage during one half cycle. If the breakover voltage is not reached (93), the triac 80 will not turn on. This will continue through many cycles until the voltage on the filter capacitor is small enough to allow C1 to charge to the breakover voltage. Once the breakover voltage has been reached (94), the triac 80 will turn on and the capacitor will charge to the peak value of the remaining half cycle input voltage. This phenomenon is illustrated in FIG. 6, requiring four cycles at 60 Hz (92) for this breakover voltage to be reached, such that the triac 80 only turns on at a subharmonic frequency, e.g., every 15 Hz as illustrated.

Figure 7:
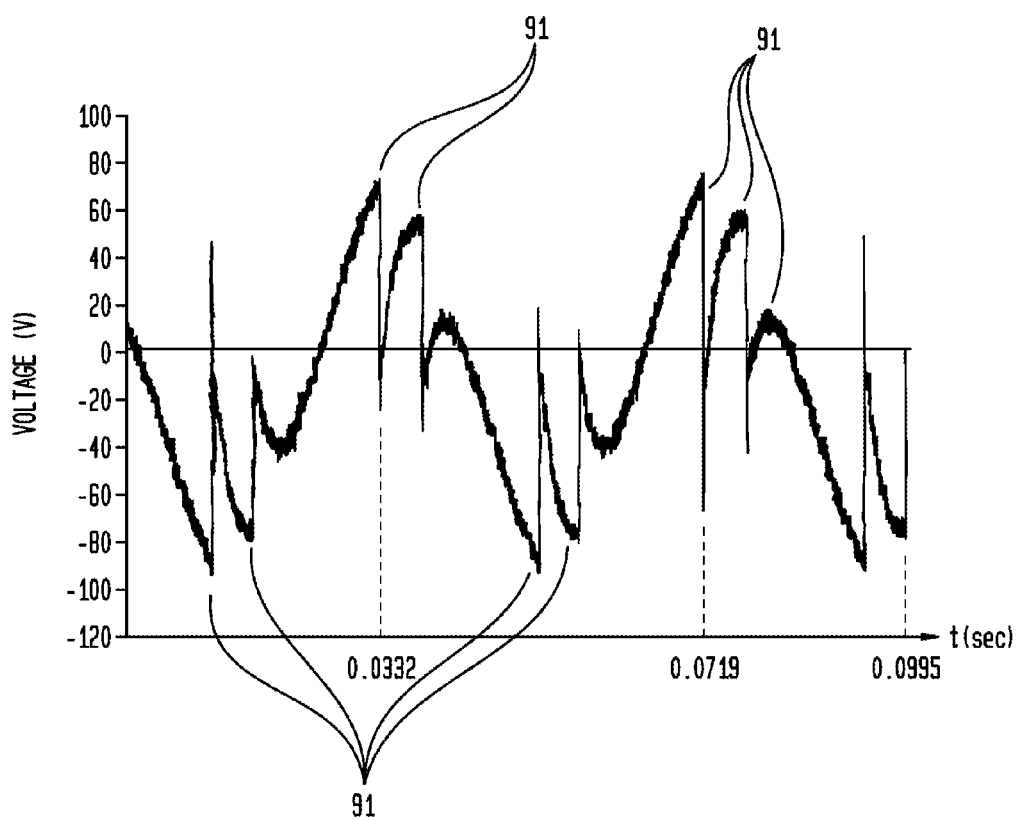
FIG. 7 is a graphical diagram illustrating a triac voltage with a 20K Ohm load and illustrating premature startup in a prior art current regulator coupled to a dimmer switch which causes perceptible LED flicker.

When a dimmer switch is used with a load drawing or sinking a small amount of current, such that $I_{LOAD}$ is less than the holding current for all values of the AC input, the triac 80 will provide inconsistent behavior unsuitable for applications with LED drivers. The nominal firing angle will increase due to the increased resistance of $Z_{LOAD}$ 81. When the capacitor (C1) voltage exceeds the diac breakover voltage, the diac 85 will discharge the capacitor into the gate of the triac 80, momentarily turning the triac on. Because the load resistance is too high to allow the necessary holding current, however, the triac 80 will then turn off. When the triac turns off, the capacitor C1 begins charging again through R1 and $Z_{LOAD}$ (81). If there is enough time remaining in the half cycle, the triac will fire again, and this process repeats itself through each half cycle. Such premature and unsustainable on-states of a triac 80 are illustrated in FIG. 7, showing the multiple firings (premature startup attempts) 91 of the triac 80 which can cause perceptible LED flicker.

For a prior art power supply in the normal status of operation, one comparatively inefficient, prior art method to provide for sufficient current through the dimmer switch 75 is to simply use a load resistor, $R_L$, in parallel with (across) the dimmer switch 75, thereby providing a load current of at least $V_{TRIAC}/R_L$ when the triac 80 is firing. By setting the resistor values small enough, the current can be made sufficiently high to ensure that it is above the threshold current (typically in the vicinity of 50 mA-100 mA) needed to keep the triac 80 in an on-state. The power dissipation across the resistor $R_L$ would be extremely high, i.e., $120^2/R_L$ when the phase angle (firing angle α) is small, further resulting in creation of significant heat. Such a load resistance is typically provided by an incandescent lamp, but is not automatically provided by an electronic or switchable load, such as a switching LED driver system.

Further, it is not always necessary to add more current to the triac 80 when it is turning on, particularly if multiple lamps are being used (incandescent bulbs or LEDs) which are drawing sufficient current. Thus, in accordance with various exemplary embodiments, instead of a "dummy" resistor $R_L$, active circuitry may be used which is capable of adjusting according to the needs of the dimmer switch 75. The exemplary embodiments provide current regulation to allow the triac 80 to switch on (fire) and to hold it in an on-state as desired. The exemplary embodiments are also more power efficient, reducing the supplemented current (and therefore $I^2R$ power loss) when there are other loads providing or sinking currents or when the phase angle α is small.

While solid state lighting (such as LED lighting) has significant environmental and energy-saving benefits, their adoption as the lighting technology of choice is less likely if they cannot be integrated into or otherwise made compatible for operation with the existing lighting infrastructure. In accordance with the present disclosure, therefore, an LED driver circuit is provided which is compatible for operation with the existing lighting infrastructure, such as dimmer switches, and may be coupled directly to and controlled by such dimmer switches, regardless of whether other loads, such as additional incandescent or fluorescent lighting, are also coupled to and controlled by such dimmer or other switches. While the exemplary embodiments are illustrated and discussed below with reference to use with dimmer switches (75), it should be noted that the exemplary embodiments are suitable for use with effectively any types of switching devices or other lighting infrastructure, except potentially those switches or other infrastructure specially designed or implemented for other purposes.

As indicated above, exemplary embodiments described herein not only recognize and accommodate various states of switches, such as phase-modulating dimmer switches, but further utilize a novel insight to also concurrently recognize and accommodate various states of a switching power supply, such that both a phase-modulating dimmer switch and a switching power supply operate together, seamlessly and with substantial stability. More particularly, the exemplary embodiments recognize and accommodate at least three states of a phase-modulating dimmer switch, namely, a first state in which the dimmer switch is not conducting but during which a triggering capacitor (C1, 77) is being charged; a second state in which the dimmer switch has turned on and requires a latching current; and a third state in which the dimmer switch is fully conducting and requires a holding current, such as for a triac (80) or thyristor. Concurrently, in combination with the states of the switch, the exemplary embodiments recognize and accommodate at least three states, and in various embodiments four states, of a switching power supply, namely, a first start-up state of the switching power supply, during which it generates its power supply ($V_{CC}$ voltage level); a second, gradual start state of the switching power supply during which it ramps up its provision of power to a load (such as LEDs) (e.g., through pulse width modulation switching) from start up to a full operational mode; a third state, during which the switching power supply is in a full operational mode; and an optional fourth state, during which the switching power supply may experience an abnormal or atypical operation and enter a protective operating mode. For each combination of states of the switch (e.g., dimmer switch) and switching power supply, using corresponding criteria for stable operation, the exemplary embodiments provide a substantially matching electrical environment to meet such criteria for stable operation of both the switch and the switching power supply, enabling seamless and stable operation of both components. In various exemplary embodiments, the same type of substantially matching electrical environment may be utilized for multiple combinations of states, and in other instances, other types of substantially matching electrical environments will be utilized for a selected combination of states of the switch and switching power supply.

Figure 8:
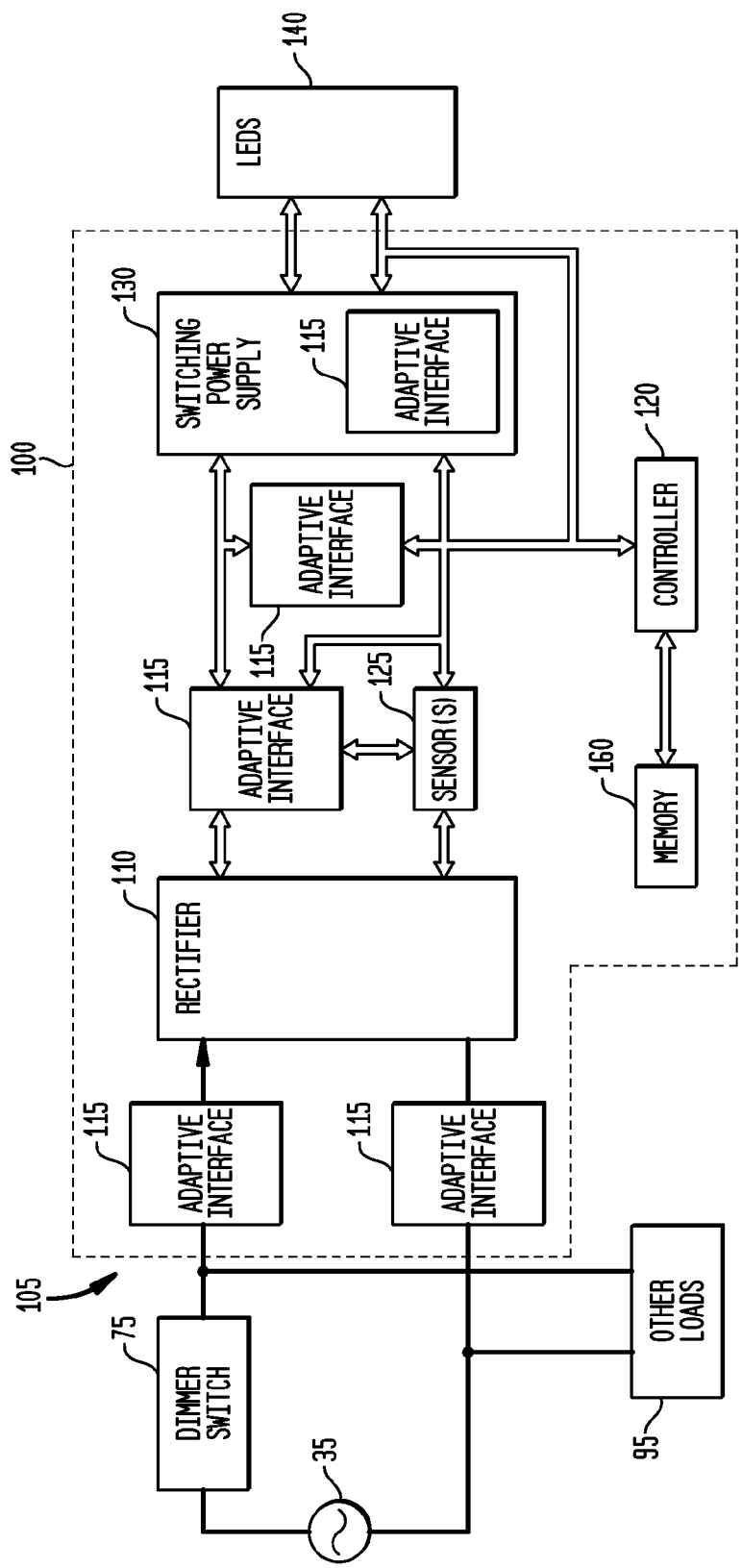
FIG. 8 is a block diagram illustrating a first exemplary apparatus embodiment and a first exemplary system embodiment in accordance with the teachings of the present disclosure.

FIG. 8 is a block diagram of a first exemplary apparatus 100 embodiment, and a first exemplary system 105 embodiment in accordance with the teachings of the present disclosure. The apparatus 100 provides power to one or more LEDs 140, which may be an array or multiple arrays of LEDs 140, of any type or color, with the apparatus 100 and LEDs 140 forming a first system 105. The apparatus 100 is compatible with existing lighting infrastructure, and may be coupled directly to a dimmer switch 75 for receiving an AC voltage (potentially phase-modulated or without any modulation) derived from the AC line voltage (AC mains) (35), and may be constructed to fit within an A19 (e.g., Edison) socket, for example and without limitation. In addition, the apparatus 100 may operate in parallel with other or additional loads 95, such as an incandescent lamp or other LEDs 140, under the common control of the dimmer switch 75.

More generally, the apparatus 100 may be utilized with any existing lighting infrastructure. In addition, it may not be known (such as by a manufacturer) in advance how the apparatus 100 and system 105 will be deployed by the end user, so such compatibility with any existing lighting infrastructure is a true advantage of the exemplary embodiments. For example, a manufacturer, distributor, or other provider of an apparatus 100 will typically not know in advance the types of switches to which the apparatus 100 and system 105 may be coupled (e.g., to a dimmer switch 75, or a non-dimming switch), whether other loads 95 may be present, and if so, what types of loads (e.g., incandescent, LED, fluorescent, etc.).

As illustrated, the apparatus 100 comprises one or more sensors 125, one or more adaptive interfaces 115, a controller 120, a switching power supply (or driver) 130, a memory (e.g., registers, RAM) 160, and typically may also comprise a rectifier 110, depending on the type of switching power supply 130 utilized. Embodiments or other implementations for a controller 120 (and any of its variations, such as 120A illustrated below) and a memory 160 are described in greater detail below. The one or more sensors 125 are utilized to sense or measure a parameter, such as a voltage or current level, with voltage sensors 125A and current sensors 125B illustrated and discussed below. For purposes of the present disclosure, it may be assumed that a rectifier 110 is present, and those having skill in the art will recognize that innumerable other variations may be implemented, are equivalent, and are within the scope of the present disclosure. The switching power supply 130 and/or the controller 120, in exemplary embodiments, may also and typically will receive feedback from the LEDs 140, as illustrated. One or more adaptive interfaces 115 may be different types and may be placed in a wide variety of locations within the apparatus 100, depending upon the selected embodiment, such as between the rectifier 110 and the dimmer switch 75, in addition to between the rectifier 110 and the switching power supply 130, or in parallel with the switching power supply 130, or within the switching power supply 130 (and more generally, an adaptive interface 115 may have any of the illustrated circuit locations, such as in series or in parallel with the rectifier or switching power supply (or driver) 130, for example and without limitation), as illustrated in FIG. 8. Exemplary adaptive interfaces 115 and/or their components may be implemented generally using active or passive components, or both. One or more sensors 125 also may be different types and may be placed in a wide variety of locations within the apparatus 100, depending upon the selected embodiment, such as voltage sensors 125A for detection of various input and/or output voltage levels, or current sensors 125B for detection of inductor current levels (e.g., within switching power supply 130) and/or LED 140 current, such as the various sensors 125 described in greater detail below. It should also be noted that the various components, such as controller 120, may be implemented in analog or digital form, and all such variations are considered equivalent and within the scope of the present disclosure. The rectifier 110 may be any type of rectifier, including without limitation, a full-wave rectifier, a full-wave bridge, a half-wave rectifier, an electromechanical rectifier, or another type of rectifier as known or becomes known in the art. The apparatus 100 and system 105 also may be implemented in any form, including in forms compatible with A19 (Edison) or T8 sockets, for example.

In accordance with exemplary embodiments, dynamic control over the one or more adaptive interfaces 115 is implemented, to account for both the current state (or timing cycle) of the switching power supply 130 and the current state (or timing cycle) of the dimmer switch 75, to provide for substantially stable operation of the apparatus 100 and system 105 without incurring the various forms of flicker or other malfunctions discussed above. Stated another way, a matching electrical (or electronic) environment is provided for each state of the dimmer switch 75 (non-conducting and charging a triggering capacitor, turning on with a latching current, and on and conducting with a holding current) in conjunction with each state of the switching power supply 130, such as a start-up state, a gradual or soft start power state, a full operational mode power state, and a protective mode state. For example, assuming that a dimmer switch 75 is installed and is not accessible directly to any sensing and functional manipulations, an exemplary method embodiment provides for interfacing of a phase-modulated dimmer switch 75 and a switching power supply 130 by controlling the functionality of the switching power supply 130 in an adaptive timely manner while concurrently recognizing the current process in the dimmer switch 75, and providing a substantially matching electrical environment for a stable completion of this dimmer 75 process and transition to another dimmer switch 75 process, such as transitioning from a charging process to a turning on process to a conducting process. Also for example and without limitation, a substantially matching electrical environment may be provided by controlling the switching power supply 130 (e.g., controlling a resonant process and current shaping), or by controlling an input impedance of the switching power supply 130, or controlling an input current to the apparatus 100, or by controlling an input power of the switching power supply 130, including control by shutting down the switching power supply 130.

Figure 9:
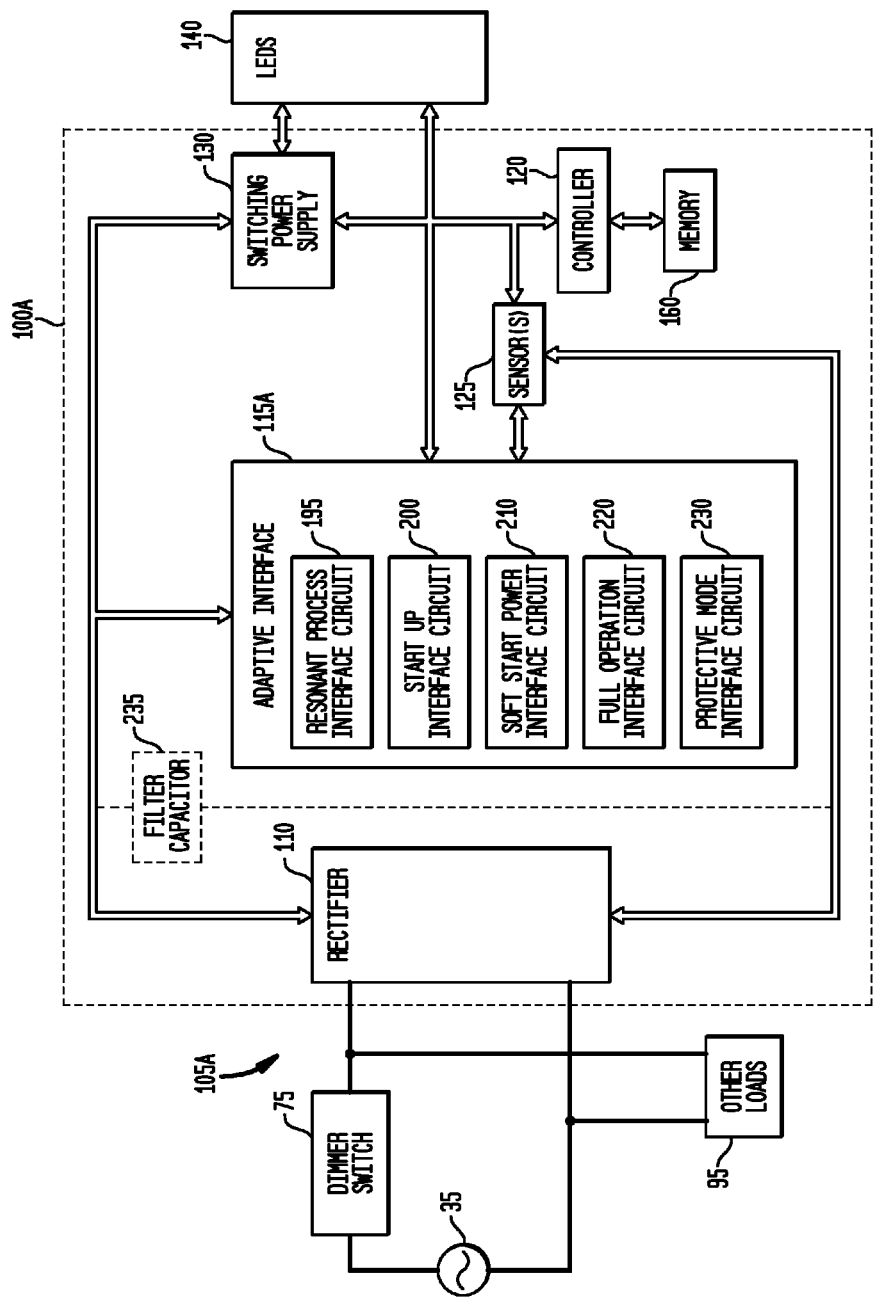
FIG. 9 is a block diagram illustrating a second exemplary apparatus embodiment, a second exemplary system embodiment, and a second exemplary adaptive interface embodiment in accordance with the teachings of the present disclosure.

FIG. 9 is a block diagram of a second exemplary apparatus embodiment 100A, a second exemplary system embodiment 105A, and a second exemplary adaptive interface embodiment 115A in accordance with the teachings of the present disclosure. In addition to the components previously discussed with reference to the first exemplary apparatus embodiment 100, the second exemplary apparatus embodiment is also illustrated as optionally comprising filter capacitor 235, discussed in greater detail below. As illustrated in FIG. 9, an exemplary adaptive interface 115A comprises one or more of five interface circuits, namely, a start-up interface circuit 200, a gradual or soft start power interface circuit 210, a full operation interface circuit 220, a resonant process interface circuit 195, and a protective mode interface circuit 230. In any selected embodiment, it should be noted that the five interface circuits 195, 200, 210, 220, and/or 230 may share common circuitry or be implemented using the same circuitry, in addition to potentially comprising separate circuits, and may share common control parameters in some instances as well. While illustrated as located between a rectifier 110 and the switching power supply 130, as discussed above, the exemplary adaptive interface 115A and/or its component interfaces 195, 200, 210, 220, and/or 230 may have any of various circuit locations within an apparatus 100A, in addition to or in lieu of those illustrated.

As mentioned above, concerning the exemplary adaptive interface 115A, we can distinguish at least four independent functional phases or states of the switching power supply 130, in conjunction with at least three operational states of a dimmer switch 75. The exemplary adaptive interface 115A recognizes and accommodates the various combinations of states of the dimmer switch 75 and the switching power supply 130 using one or more of the component interfaces 195, 200, 210, 220, and/or 230. During switching power supply 130 start up, exemplary start-up interface circuit 200 is utilized for creating an operational voltage ($V_{CC}$) for a power supply controller 120, during which all other switching power supply 130 circuits are disabled and energy consumption is comparatively small, and for providing or allowing sufficient current to the dimmer switch 75 for any of its three states. During a gradual or soft start for supplying power by the switching power supply 130, as an electrical process of supplying increasing levels of energy to the output load (LEDs 140), and energy consumption is comparatively small energy, gradual or soft start power interface circuit 210 is utilized to allow both ramping up of output energy and sufficient current to the dimmer switch 75 for any of its three states. During full operation of the switching power supply 130, having nominal energy consumption, resonant process interface circuit 195 and full operation interface circuit 220 are utilized to provide current shaping (generally controlling input current levels) and also allow sufficient current to the dimmer switch 75 for any of its three states. A protective mode of operation, in which the switching power supply 130 or its various components are shut down and energy consumption is comparatively small, is also implemented using protective mode interface circuit 230, which, depending upon the selected embodiment, may also effectively shut down the dimmer switch 75 or may allow sufficient current to the dimmer switch 75 for any of its three states.

By controlling the adaptive interface 115 and/or its component interfaces 195, 200, 210, 220 and/or 230, the various processes (or states) of the dimmer switch 75 are also controlled, including without limitation: (a) the charging of the triggering capacitor (C1) 77 and firing of the diac (D1) 85 (and, in order to preserve the dimmer switch 75 mechanical position (value of R1) related to the desired dimming level provided by the user, the external impedance of charging circuit (input impedance of the apparatus) is substantially close to one provided by an incandescent bulb (e.g., $Z_{LOAD}$ 81), and no energy is supplied to the power supply); (b) turning on of the dimmer switch 75 (e.g., triac 80) with a substantially minimum current nonetheless sufficient to exceed the triac 80 latching current, which involves a transient input to the apparatus 100 from zero power to any power sourced by AC line 35; and (c) conducting current through the dimmer switch 75 (triac 80) through the end of the current AC cycle (e.g., until zero voltage during the phase α, which may be referred to equivalently (although inexactly) as a zero crossing) with a current as may be needed and nonetheless sufficient to exceed the triac 80 holding current with any power sourced by the AC line to the switching power supply 130. For a reverse dimmer, the charging process ((a) above) generally follows the conducting process ((c) above), and those having skill in the art will recognize the application of the exemplary embodiments and principles taught herein to such situations.

Figure 10:
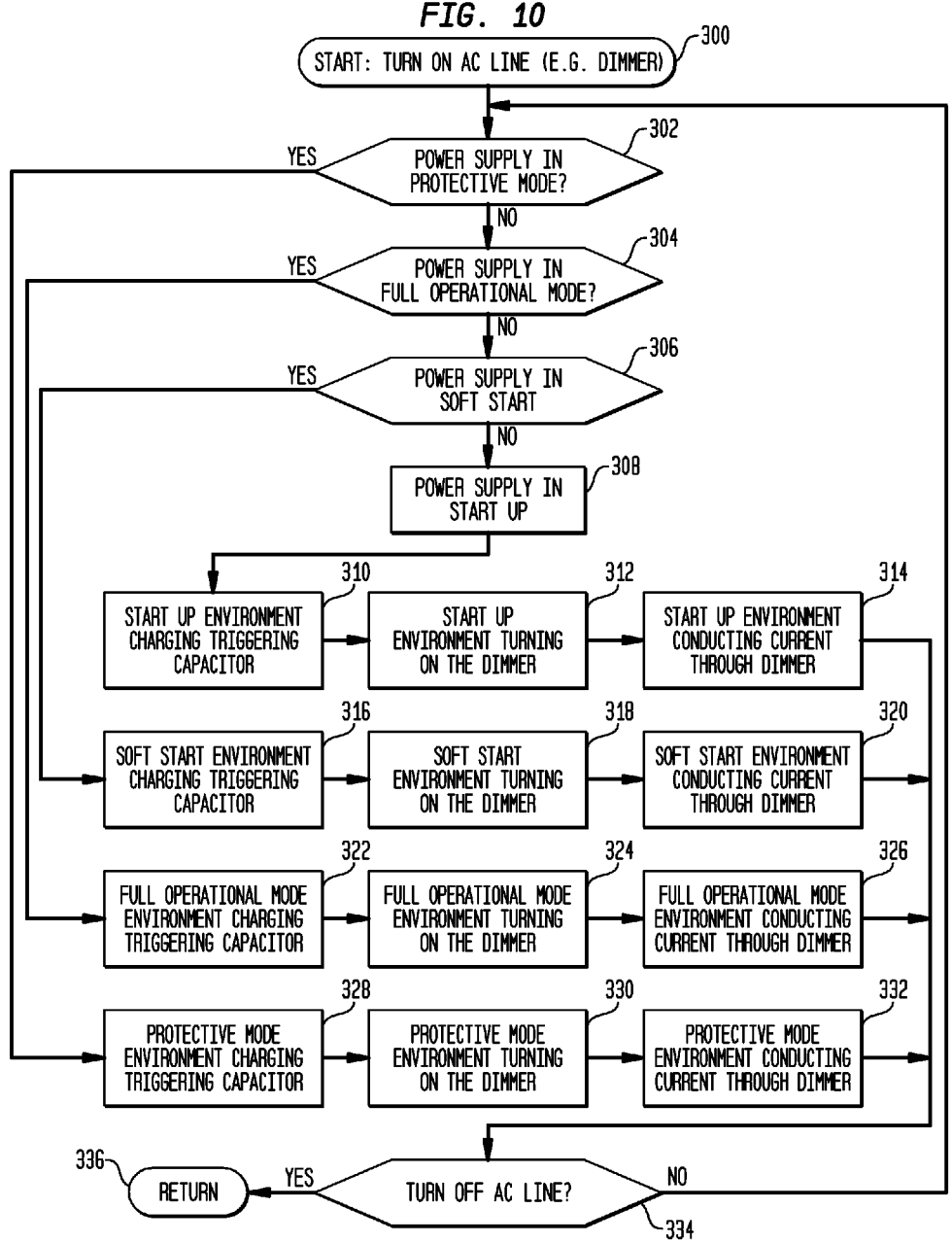
FIG. 10 is a flow diagram illustrating a first exemplary method embodiment in accordance with the teachings of the present disclosure.

FIG. 10 is a flow diagram of a first exemplary method embodiment in accordance with the teachings of the present disclosure. The various states of the switching power supply 130 and the dimmer switch 75 may be viewed as forming a matrix, such that the functionality of the switching power supply 130 is controlled in a timely and adaptive manner, recognizing the current process of the dimmer switch 75, the current state of the switching power supply 130, and providing a corresponding substantially matching electrical environment for substantially stable operation of the dimmer switch 75, the provision of appropriate power to the LEDs 140, and the corresponding substantially stable transition from state to state. Referring to FIG. 10, the method begins with the turning on of the AC line, such as by a user mechanically turning on a dimmer switch 75, start step 300. The apparatus 100, 100A (or the other apparatus embodiments discussed below) (and/or the controller 120, 120A) then determines the functional status of the switching power supply 130, whether it is in any of the four states mentioned above, a protective mode, full operational mode, gradual or soft start mode, or by default in a start-up mode (steps 302, 304, 306, and 308). For each of these possible states of the switching power supply 130, a state of the dimmer switch 75 is determined (e.g., through one or more sensors 125) and a corresponding substantially matching electrical environment is provided for the combination of states of both the switching power supply 130 and the dimmer switch 75. Stated another way, for each of four states of the switching power supply 130, one or more substantially matching electrical environments is provided when the triggering capacitor 77 (C1) is being charged (steps 310, 316, 322, and/or 328), or when the dimmer switch 75 (triac 80) is turning on (steps 312, 318, 324, and/or 330), or when current is being conducted through the dimmer switch 75 (steps 314, 320, 326, and/or 332). Following steps 314, 320, 326, and/or 332, the method determines whether the AC line (dimmer switch 75) has been turned off, step 334, and if not, the method returns to step 302 and iterates, and if so, the method may end, return step 336. As a consequence, the apparatus 100, 100A (or the other apparatus embodiments discussed below) provides a substantially matching electrical environment corresponding to both the state of the dimmer switch 75 and the switching power supply 130. The various combinations of states, monitoring of states, and provision of substantially matching electrical environments is discussed in greater detail below.

For each of these 12 combinations of states or processes, and depending on the intended deployment (e.g., 110 V, 220 V), corresponding parameters are predetermined and stored in memory 160, and then in subsequent operation, are retrieved from the memory 160 and utilized by the controller 120 to provide the corresponding substantially matching electrical environment. As mentioned above, a substantially matching electrical environment may be provided by the controller 120 by controlling the switching power supply 130 (e.g., controlling a resonant process, current shaping, and other methods discussed below), or by controlling an input impedance of the switching power supply 130, or controlling an input current to the apparatus 100, or by controlling an input power of the switching power supply 130, including control by shutting down the switching power supply 130, for example and without limitation. It should be noted, however, that for various combinations of states, the corresponding parameters and/or types of control may be substantially similar of the same, depending on the selected embodiment. The corresponding parameters and/or types of control may be determined in a wide variety of ways, such as based upon minimum voltage levels for any and/or all countries, component values, maximum voltage levels to be tolerated by a switching power supply 130 and/or LEDs 140, characteristics of dimmer switches 75 (such as minimum holding and latching currents), etc., with exemplary methods of predetermining corresponding parameters discussed in greater detail below. For example and without limitation, a minimum current parameter (e.g., 50 mA) may be utilized and sensed via a current sensor 125B, with a controller 120, 120A then providing corresponding gating or modulation of the various switches and other circuits comprising an adaptive interface 115 to ensure such minimum current flow. Accordingly, as the dimmer switch 75 and switching power supply 130 change their respective functional statuses, the inventive method implemented by an apparatus 100, 100A-G (or the other apparatus embodiments discussed below) automatically adapts and adjusts using a new set of corresponding parameters for the corresponding combination of states of the dimmer switch 75 and switching power supply 130.

For example, a method of interfacing a power supply 130 powered through a dimmer switch 75 during the start-up state of an apparatus 100, 100A-G (switching power supply 130), by providing a substantially matching electrical environment, may comprise the following sequence (FIG. 10, steps 310-314):

1. Monitoring the status of the dimmer switch 75 (steps 310-314).
2. Recognizing that the dimmer switch 75 status is that of charging its triggering capacitor 77 (step 310).
3. Providing a comparatively low impedance to the dimmer switch 75 (steps 310-314), thereby allowing sufficient current to flow to charge the triggering circuitry, and further effectively emulating an incandescent lamp. For example, the provided impedance can be constant with a maximum value to create current at dimmer switch 75 turn on slightly exceeding the latching and holding current thresholds (steps 312-314). The matching impedance, in the case of an available independent control voltage, can be adaptive, changing its value based on triggering circuit charge time to sink the current slightly over latching and holding current thresholds, which may be correspondingly defined at the values of instantaneous AC voltage at dimmer turn on.

4. Sensing when the dimmer switch 75 is turned on and conducting, and continuing to provide the matching impedance to the dimmer switch 75 to sink current slightly over holding current threshold (step 312).
5. Starting a process of building an operational voltage for the apparatus 100, 100A-G (by active or passive circuits), such as to provide an operating voltage ($V_{CC}$) to the controller 120. The provided matching interface impedance(s) will remain activated through this process which may take a few complete sequential cycles of the dimmer switch 75, namely, charging the triggering capacitor 77, turning the dimmer switch 75 (triac 80) on and conducting current through the dimmer switch 75 (steps 310-314).
6. Monitoring the level of the operational voltage of the apparatus 100, 100A-G.
7. At a power-on reset threshold voltage level, enabling the controller 120 and transitioning to the gradual or soft start of the switching power supply 130.
8. Continuing providing a matching impedance(s) to the dimmer switch 75 to charge triggering capacitor, turn on the dimmer switch 75 and adaptively sink sufficient current over the latching and then holding current thresholds during the transition to gradual or soft start (steps 310-314).

Accordingly, during start up of the apparatus 100, 100A-G and its incorporated switching power supply 130, for any state of the dimmer switch 75, an interface circuit (e.g., 115, 200, 210, and/or the others discussed below) is utilized for providing an appropriate impedance to allow sufficient current for the corresponding state of the dimmer switch 75, thereby generating a corresponding, substantially matching electrical environment for each combination of states.

Figure 11:
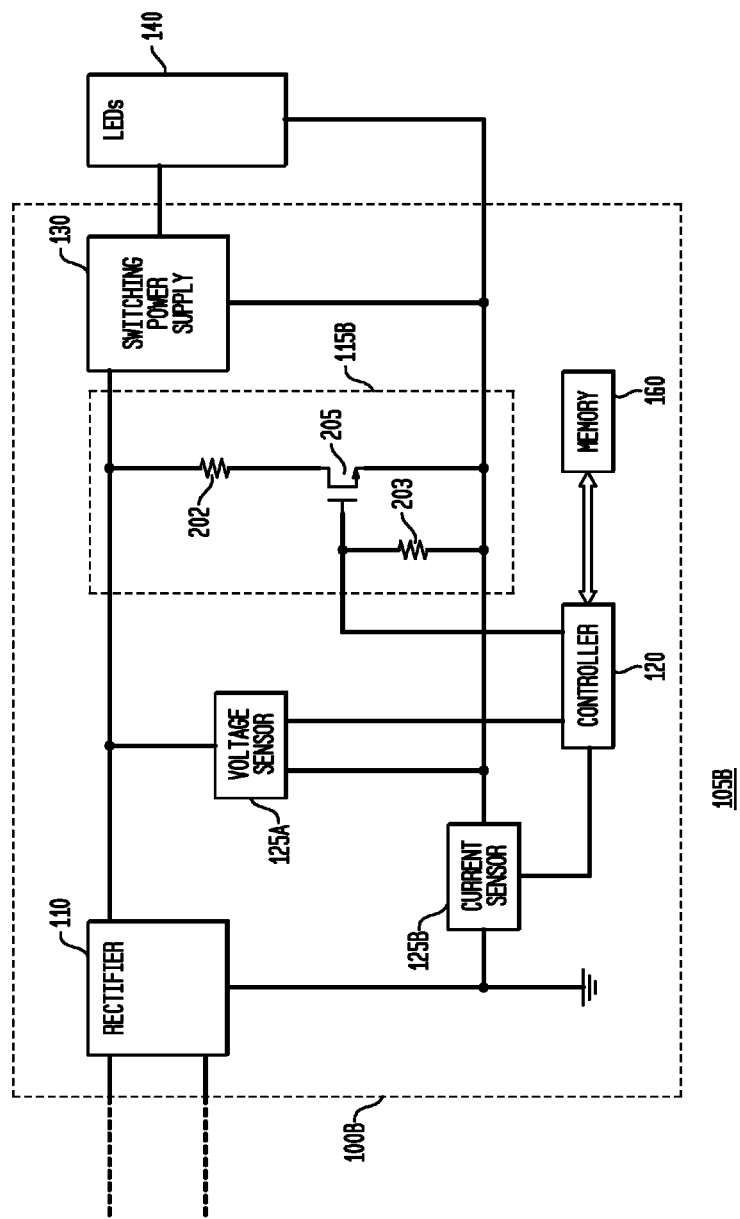
FIG. 11 is a block and circuit diagram illustrating a third exemplary apparatus embodiment, a third exemplary system embodiment, and a third exemplary adaptive interface embodiment in accordance with the teachings of the present disclosure.

FIG. 11 is a block and circuit diagram of a third exemplary apparatus embodiment 100B, a third exemplary system embodiment 105B, and a third exemplary adaptive interface embodiment 115B in accordance with the teachings of the present disclosure. Not separately illustrated, the apparatus 100B may be coupled to a dimmer switch 75 and an AC line 35 as previously illustrated in FIGS. 8 and 9. For example and without limitation, the third exemplary adaptive interface embodiment 115B may be utilized during start up, gradual or soft start and other processes (and states of the switching power supply 130), and may be utilized to implement either or both a start-up interface circuit 200, a gradual or soft start power interface circuit 210, and/or a full operation interface circuit 220, for example and without limitation. Referring to FIG. 11, third exemplary adaptive interface embodiment 115B comprises a resistive impedance (resistor 202), switch 205 and optional resistor 203, with the resistor 202 connected to the dimmer switch 75 (and in parallel with the switching power supply 130) by the switching of a switch (depletion mode MOSFET) 205, which is on and conducting without the provision of any control signal from the controller 120, providing a comparatively low impedance as a substantially matching electrical environment and further providing the comparatively low impedance as a default mode, such as during $V_{CC}$ generation (steps 310-314) or during gradual or soft start (steps 316-320). Providing such a comparatively low impedance as a default mode serves to ensure that the dimmer switch 75 functions properly and has sufficient trigger capacitor charging, latching, and holding currents, provided through the resistive impedance (resistor 202) and switch 205, such as when the controller 120 and switching power supply 130 are generating their respective operational voltages and may not yet be fully functional, e.g., when the dimmer switch 75 is initially turned on by a user. If during this initial start-up time interval the controller 120 has an independent voltage source (such as a battery) or it develops an operational voltage, the controller 120 may change (adapt) this impedance to the optimal conditions for dimmer performance, as may be sensed by a voltage and/or current sensor 125A, 125B. Following such start up, the controller 120 may provide a control signal to the gate of the switch (MOSFET) 205, such as to modulate the current flow through resistor 202 and switch 205, such as for gradual or soft start power mode of the switching power supply 130, or to decrease or terminate the additional current flow through adaptive interface embodiment 115B, such as during full operational mode of the switching power supply 130 when sufficient current may be drawn by the switching power supply 130. Those skilled in the art, using principles of this disclosure, may suggest a variety of other circuits to provide a comparatively low resistive impedance to the dimmer without any control signal for such a start-up process and a default mode.

During gradual or soft start of the system 105B (FIG. 11), the controller 120 ramps up power to the load (LEDs) 140 compatible with the stable operation of the apparatus 100B (and other apparatuses 100, 100A, 100C-G). Typically at or during gradual or soft start, the operating switching frequency, output voltage and output current are increasing. A significant parameter for the adaptive interface 115B is increasing input power to the switching power supply 130 from levels below the matching of the minimum needs of the dimmer switch 75 to the levels far exceeding that minimum level to provide power to the LEDs 140. An exemplary method of a gradual or soft start up of a switching power supply 130 powered by a dimmer switch 75, by providing a substantially matching electrical environment to the dimmer switch 75, such as using interface 115B providing a resistive impedance, may comprise the following sequence (FIG. 10, steps 316-320):

1. Transitioning from a start-up stage to a gradual or soft start stage asynchronously to the state of the dimmer switch 75, i.e., gradual or soft start may commence regardless of the state of the dimmer switch 75, such as when the dimmer switch 75 is in any one of its three cyclical states of charging its triggering capacitor, turning on the dimmer switch 75, or conducting current through the dimmer switch 75.
2. Continuing providing (via an adaptive interface 115) a substantially matching electrical environment (as with the case for the power supply 130 start up), such as using interface 115B, to keep the dimmer switch 75 operation stable in each of its possible three states until the input voltage is substantially zero (e.g., a zero crossing).
3. Monitoring the status of the dimmer switch 75 after a zero crossing, such that if the dimmer switch 75 is off (a forward dimmer), providing a matching resistive impedance to the triggering circuit of the dimmer 75 via an adaptive interface 115, and if the dimmer switch 75 is on (a reverse dimmer), providing a matching adaptive power sink to the dimmer via an adaptive interface 115. The total matching power sink to the dimmer switch 75 is equal to the sum of input power of the switching power supply 130 and additional power consumed by an adaptive interface 115. Exemplary matching adaptive power sinks are discussed in greater detail below with reference to FIGS. 14-16.
4. Monitoring a change of the dimmer switch 75 status from charging to turning on and conducting current for a forward dimmer and providing a matching adaptive power sink to the dimmer switch 75 via an adaptive interface 115 and providing a matching resistive impedance to a triggering circuit of a reverse dimmer.
5. Cyclically changing the dimmer matching electrical environment compatible with and corresponding to the dimmer switch 75 cyclical status.
6. Phasing the additional current drawn by an adaptive interface 115 to zero as input power of the switching power supply 130 increases and goes over a minimum level for ongoing stable operation of the dimmer switch 75.
7. Transitioning to a full operation power mode and discontinuing operations of applicable adaptive interfaces 115 as necessary or desirable.

Accordingly, during gradual or soft start of the apparatus 100, 100A-G, and its incorporated switching power supply 130, for any state of the dimmer switch 75, an interface circuit (e.g., 200, 210 and/or the others discussed below) is utilized for providing an appropriate impedance to allow sufficient current for the corresponding state of the dimmer switch 75 and to provide current shaping/control during dimmer turn on (as discussed in greater detail below), thereby generating a corresponding, substantially matching electrical environment for each combination of states. As the switching power supply 130 ramps up to a full operational mode, the additional current sinking provided by the adaptive interface 115 is decreased, while concurrently maintaining sufficient current through the dimmer switch for any of its charging, turning on, and conducting states.

Figure 12:
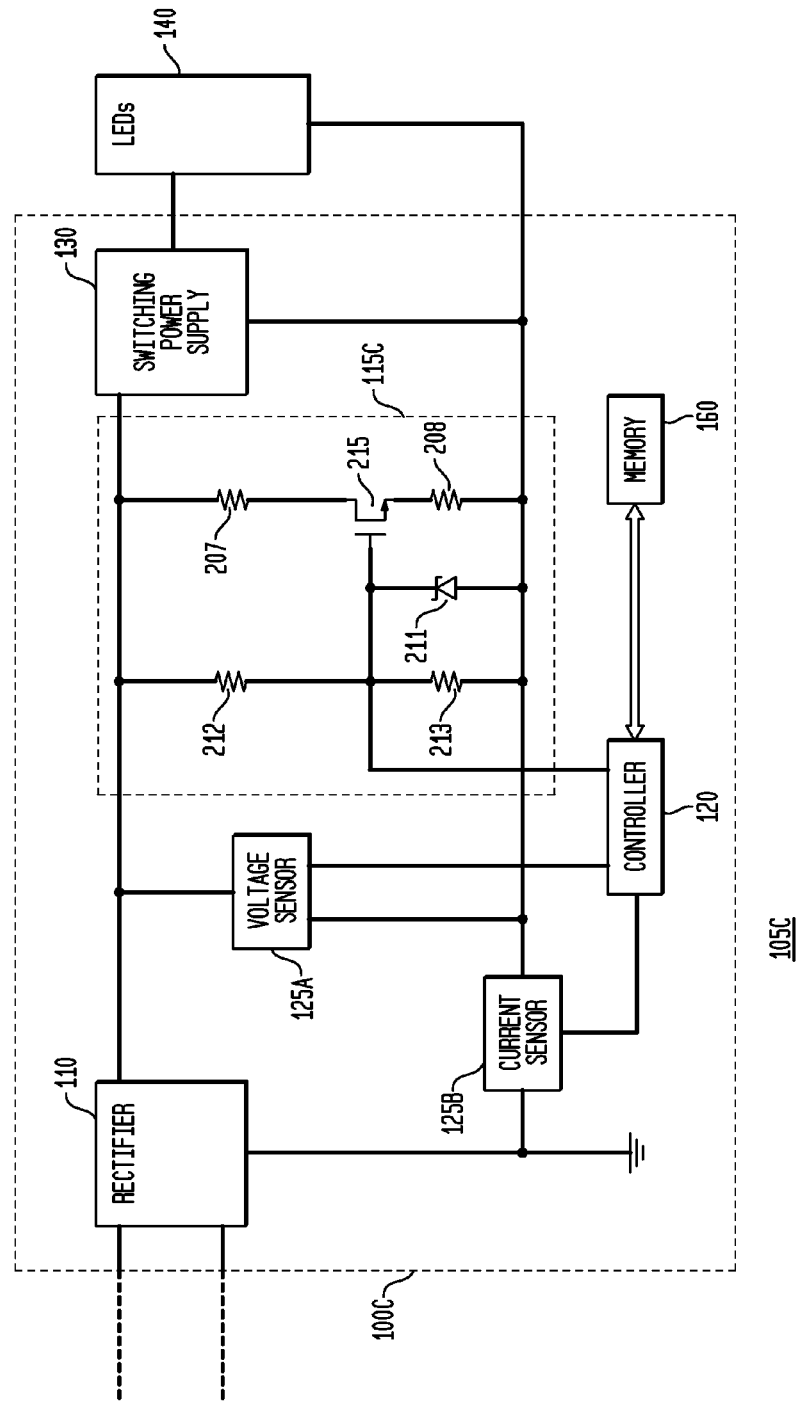
FIG. 12 is a block and circuit diagram illustrating a fourth exemplary apparatus embodiment, a fourth exemplary system embodiment, and a fourth exemplary adaptive interface embodiment in accordance with the teachings of the present disclosure.
Figure 13:
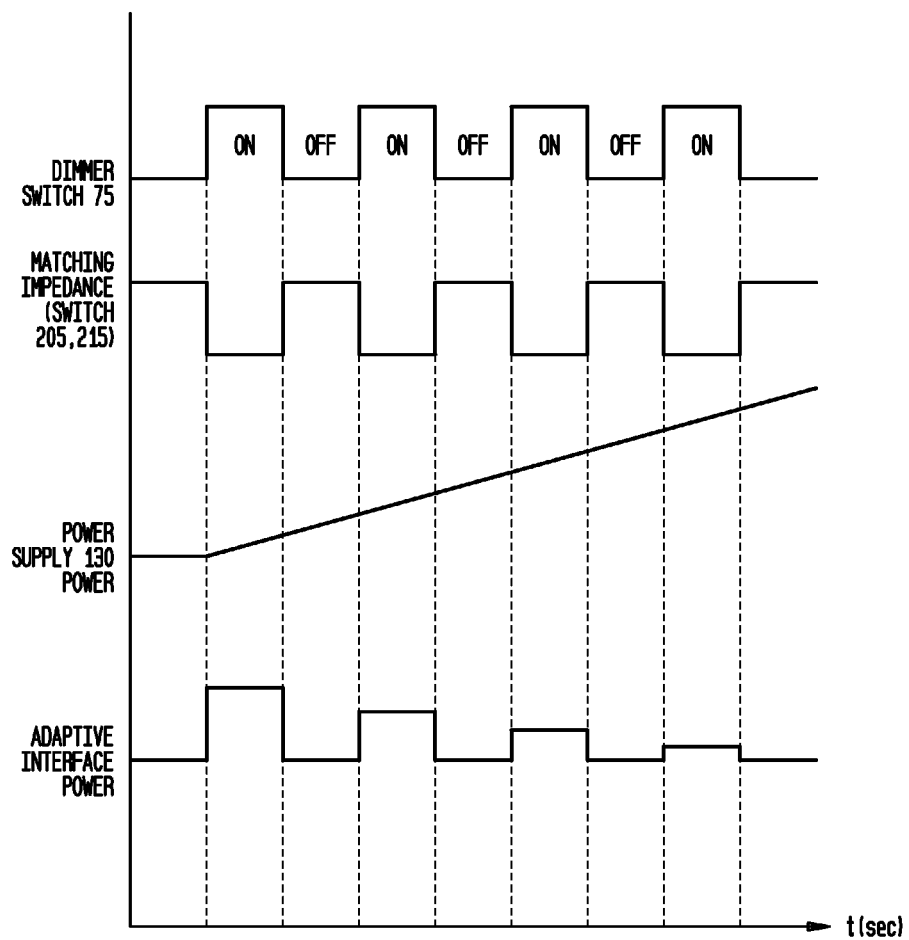
FIG. 13 is a graphical timing diagram for exemplary switching of a dimmer switch, an exemplary adaptive interface embodiment, power provided to an exemplary switching power supply, and exemplary adaptive interface power, in accordance with the teachings of the present disclosure.

FIG. 12 is a block and circuit diagram of a fourth exemplary apparatus embodiment 100C, a fourth exemplary system embodiment 105C, and a fourth exemplary adaptive interface embodiment 115C in accordance with the teachings of the present disclosure. Not separately illustrated, the apparatus 100C may be coupled to a dimmer switch 75 and an AC line 35 as previously illustrated in FIGS. 8 and 9. FIG. 13 is a graphical timing diagram for exemplary switching of a dimmer switch, an exemplary adaptive interface 115 embodiment, power provided to an exemplary switching power supply 130, and exemplary adaptive interface power utilization, in accordance with the teachings of the present disclosure. For example and without limitation, the fourth exemplary adaptive interface embodiment 115C may be utilized during both start up and gradual or soft start processes for any state of the dimmer switch 75 (steps 310-320), also may be utilized during full operational mode (step 322), and may be utilized to implement either or both a start-up interface circuit 200 and/or a gradual or soft start power interface circuit 210, for example and without limitation. The fourth exemplary adaptive interface embodiment 115C comprises a matching resistive impedance 207 and 208 connected to the dimmer switch 75 by a switch (MOSFET) 215, to provide a substantially matching electrical environment for the dimmer switch 75 (for any of its three states) during start up and/or during gradual or soft start of the switching power supply 130. This matching resistive impedance can be either constant by using a gate-to-source voltage defined by an optional zener diode 211, or variable and driven by a control voltage from controller 120. The dimmer switch 75 status is sensed by the voltage sensor 125A in this exemplary embodiment. When the dimmer switch 75 is turning on, the controller 120 regulates the current sink circuit formed by resistors 207, 208, 212, 213, and switch (MOSFET) 215. The adaptive interface 115C is effectively regulating the input power to the system 105C such that the minimum current to be put through the dimmer switch 75 for its stable operation is exceeded. As gradual or soft start of the switching power supply 130 progresses to its full operational state and when the dimmer switch 75 is on and conducting, the additional power consumed by an adaptive interface 115C is gradually phased out to zero, as illustrated in FIG. 13.

Accordingly, during either start up or gradual or soft start states of the switching power supply 130, an adaptive interface 115, such as 115B or 115C, provides a corresponding and substantially matching electrical environment to the dimmer switch 75, such as a constant or variable impedance allowing sufficient current through the dimmer switch 75 to be greater than or equal to a latching or holding current (when the dimmer is turning on or is in an on-state, steps 312, 314, 318, and/or 320) and to provide a current path for charging the triggering capacitor (when the dimmer is in an off or non-conducting state, FIG. 10, steps 310, 316). During full operational mode of the switching power supply 130, such a substantially matching electrical environment to the dimmer switch 75, such as a constant or variable impedance, may also be used to provide a current path for charging the triggering capacitor (when the dimmer is in an off or non-conducting state, FIG. 10, step 322).

A substantially matching electrical environment is also provided, actively (dynamically) or passively, during the full operational mode of the switching power supply 130. In various exemplary embodiments, a resonant mode is created for controlling an inrush, peak current when the dimmer switch 75 turns on, which is further actively modulated to avoid excessive current levels while concurrently maintaining minimum latching and holding currents for the dimmer switch 75, as discussed in greater detail below. Referring again to FIG. 9, an optional filter capacitor 235 may be implemented to provide power factor correction, for example. The filter capacitor 235 may be connected after the rectifier 110 as illustrated, or between the rectifier 110 and the dimmer switch 75. Inclusion of such a filter capacitor 235, however, can serve to extend and delay the charging time for the triggering capacitor 77. Various modeling has shown, for example, that a 3.4 ms delay for charging the triggering capacitor 77 when connected to an incandescent bulb may be extended to 4.2 ms when such a filter capacitor 235 is utilized, potentially leading to non-triggering of the diac 85 due to a low voltage on triggering capacitor 77, even after one-half cycle of charging. To avoid undue delay in charging of the triggering capacitor 77, in accordance with the exemplary embodiments, the capacitance of the filter capacitor 235 should not exceed the capacitance of the triggering capacitor 77 by more than three orders of magnitude. In an exemplary embodiment, the filter capacitor 235 is comparatively small, on the order of about 0.5-2.5 µF, and more particularly on the order of about or substantially 0.1-0.2 µF in various exemplary embodiments, as a larger filter capacitor 235 would interfere with charging of the triggering capacitor (77).

Use of such a comparatively small filter capacitor 235, however, without additional components provided in the exemplary novel embodiments and discussed below, would allow for a substantial and potentially excessive peak current into the switching power supply 130 when the dimmer switch 75 is turned on, which may be harmful to the switching power supply 130, among other things. Accordingly, to avoid such a peak inrush current, exemplary embodiments create and modulate a resonant process during full operational mode of the switching power supply 130 when the dimmer switch 75 is turning on (FIG. 10, step 324), such as by using an adaptive interface 115D, 115E, and/or 115F, as illustrated and discussed in greater detail below with reference to FIGS. 14-16 and FIGS. 20-23. Such creation and modulation of a resonant process may also be utilized during other states of the switching power supply 130 and dimmer switch 75, such as during gradual or soft start when the dimmer switch 75 is turning on (step 318) and otherwise during the transition from gradual or soft start to full operational mode.

Exemplary apparatus 100B and 100C also comprise a voltage sensor 125A which may be utilized to sense the status of the dimmer switch 75. Alternatively, other types of sensors 125 may also be utilized equivalently to determine the status of the dimmer switch 75. When the sensor 125 indicates that the dimmer switch 75 is off due to zero voltage of a forward dimmer or the dimmer turning off for a reverse type of dimmer, the voltage across the input filter capacitor 235 drops to a very small value. At about this time, during full operational mode, the controller 120 turns on at least one switch of the switching power supply 130 (e.g., 285 in FIG. 17) which is series connected to the input via at least one magnetic winding (and as illustrated by the primary winding of flyback transformer 280 in FIG. 17 or an inductor such as inductor 236 of FIGS. 14-16). Due to the comparatively small values of the capacitance of the filter capacitor 235 and inductance of inductors in the switching power supplies working in the practical range of frequencies from 50 kHz to 1 MHz, the external impedance to charge the triggering capacitor 77 is comparatively small and is in the range of an incandescent bulb value, thereby allowing sufficient current to charge the triggering capacitor 77 (FIG. 10, step 322). Accordingly, during full operational mode and the transition to full operational mode from gradual or soft start, during charging of the triggering capacitor 77, circuits within the switching power supply 130 may be utilized to ensure sufficient charging current (in addition to ensuring sufficient latching and holding currents), without requiring additional resistive impedances or current sinks, etc., to draw additional current for this purpose.

An exemplary first method of operating an apparatus having a switching power supply 130 and an input filter capacitor 235 (having a comparatively low capacitance, i.e., a small capacitor) during a full operation mode and when powered by a dimmer switch 75, by providing a substantially matching electrical environment to the dimmer switch 75, may comprise the following sequence (FIG. 10, step 322):

1. Monitoring the status of the dimmer switch 75.
2. When the dimmer switch 75 has turned off, turning on the primary switch of the switching power supply 130 in a first switching mode with a substantially maximum practical duty cycle (up to 100%) (FIG. 10, step 322) (and also effectively providing an additional current path to allow charging of the triggering capacitor, such as using an adaptive interface 115, as may be necessary or desirable, for example, based on monitoring of voltage or current levels (e.g., 115B, 115C)). For such charging of the triggering capacitor during full operational mode, it should be noted that components internal to the switching power supply 130 may be utilized to provide the current path to allow such charging, rather than other additional components.
3. Continuing switching the switching power supply 130 in the first mode with the substantially maximum duty cycle if it less than one-hundred percent (100%), or keeping it in a DC mode if it is 100%.
4. When the dimmer switch 75 turns on, operating the switching power supply 130 in a second switching mode having the duty cycle determined by feedback from the switching power supply 130, such as via voltage or current sensors 125A, 125B, or feedback from another circuit component, such as LED 140 current.

As mentioned above, a magnetic winding of some kind, such as an inductor 236 or transformer, will be connected in series to the rectifier 110 at some point during the switching cycle of the switching power supply 130. Inclusion of such a filter capacitor 235 and magnetic winding (inductor 236) may serve to reduce the reliability of the performance of a dimmer switch 75 without the introduction of a corresponding substantially matching electrical environment in accordance with the exemplary embodiments, using methods in addition to those discussed for the start up and gradual or soft start functional phases of the switching power supply 130, to provide for a more optimal performance of the switching power supply 130 during full operational mode (following gradual or soft start).

Figure 14:
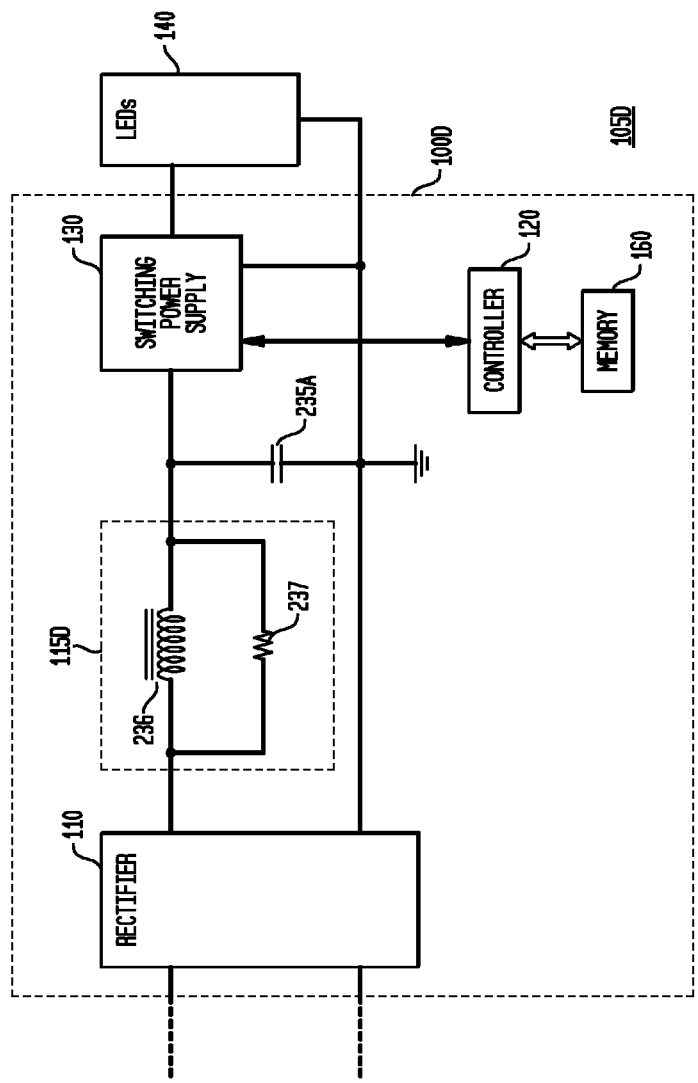
FIG. 14 is a block and circuit diagram illustrating a fifth exemplary apparatus embodiment, a fifth exemplary system embodiment, and a fifth exemplary adaptive interface embodiment in accordance with the teachings of the present disclosure.
Figure 20:
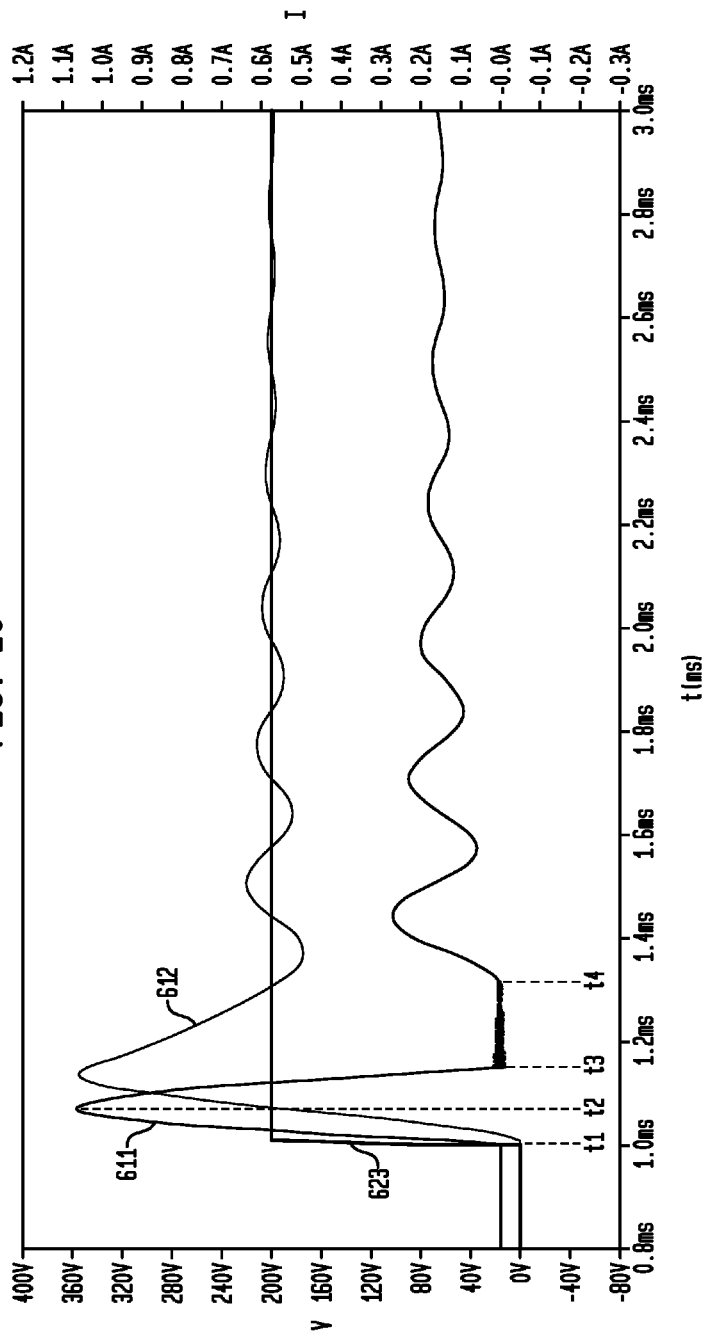
FIG. 20 is a graphical diagram illustrating exemplary transient voltage and current waveforms for a switch turn on in a resonant mode.

FIG. 20 is a graphical diagram illustrating exemplary voltage and current waveforms for a switch turn on in a resonant mode if an inductor or other magnetic winding, without additional circuitry, is included, such as for the circuit of FIG. 14 if resistor 237 were not included (contrary to various exemplary embodiments). While the peak current 611 and voltage 612 waveforms are damped oscillations and by including an inductor 236 are now below excessive current levels, during the time interval of t3 to t4, another problem may be created, as the illustrated modeling indicates that dimmer switch 75 current is substantially zero, potentially resulting in a malfunction of the dimmer switch 75 and causing perceptible flicker.

Figure 21:
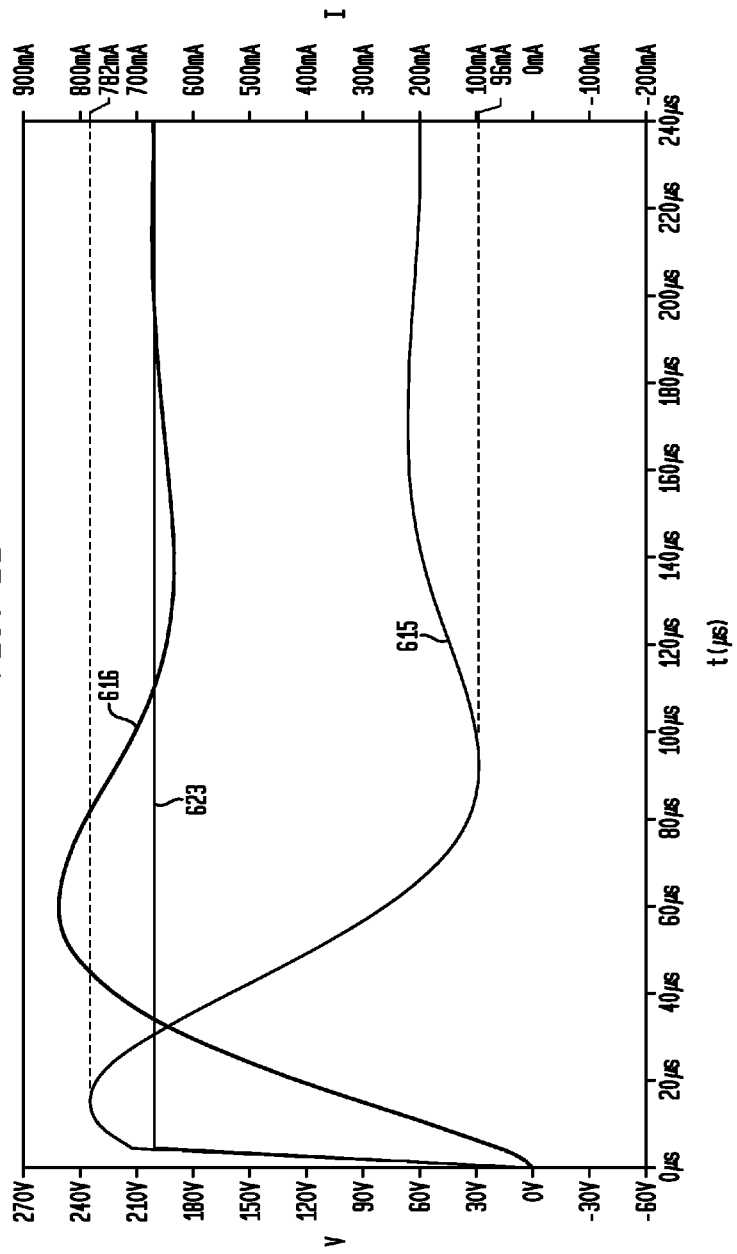
FIG. 21 is a graphical diagram illustrating exemplary, modeled transient voltage and current waveforms for a fifth exemplary apparatus embodiment, a fifth exemplary system embodiment, and a fifth exemplary adaptive interface embodiment in accordance with the teachings of the present disclosure.

Various experimental modeling and theoretical analyses indicate, however, that with typical inductance and capacitance values of a prior art switching power supply, because the filter capacitor 235 is likely discharged by the time the dimmer switch 75 turns on, the turning on of the dimmer switch 75 will produce transient voltage and current levels which may create an unstable, oscillatory interface with the dimmer switch 75. To avoid such an unstable, oscillatory interface with the dimmer switch 75, a substantially matching electrical environment is introduced in accordance with the exemplary embodiments, using an adaptive interface 115D which shapes or otherwise alters the current provided through the dimmer switch 75. FIG. 14 is a block and circuit diagram of a fifth exemplary apparatus embodiment 100D, a fifth exemplary system embodiment 105D, and a fifth exemplary adaptive interface embodiment 115D in accordance with the teachings of the present disclosure. FIG. 21 is a graphical diagram illustrating exemplary, modeled transient voltage 616 and current 615 waveforms for a fifth exemplary apparatus embodiment, a fifth exemplary system embodiment, and a fifth exemplary adaptive interface embodiment in accordance with the teachings of the present disclosure. Not separately illustrated, the apparatus 100D may be coupled to a dimmer switch 75 and an AC line 35 as previously illustrated in FIGS. 8 and 9. The adaptive interface 115D is an exemplary passive embodiment of a full operation interface circuit 220, for example and without limitation. The adaptive interface 115D comprises a resistor 237 connected in parallel with inductor 236, and the inductor 236 and capacitor 235A form a resonant circuit. When the resonant current reaches its peak, the voltage across the inductor 236 changes polarity and partially discharges through the resistor 237, thereby diminishing the inrush current into the switching power supply 130 and preventing current to further charge filter capacitor 235A, while simultaneously allowing sufficient latching and holding currents for the dimmer switch 75. Adaptive interface 115D provides a passive implementation of the method of interfacing of the dimmer switch 75 and switching power supply 130 by providing a substantially matching electrical environment through shaping dimmer switch 75 current in the resonant process and provides latching and holding currents well above any typical minimum value for a dimmer switch 75. As illustrated in FIG. 21, experimental modeling indicates significant damping and effective elimination of any unwanted oscillation following switch turn on (waveform 613), and further may provide a minimum dimmer switch 75 current of about 96 mA (current waveform 615), a value above typical holding current levels (e.g., 50 mA), while latching current has been shown to be about 782 mA, also well above the typical minimum latching current threshold.

In accordance with exemplary embodiments, the inductance and capacitance values of the resonant components outside the dimmer switch 75 (or otherwise a characteristic impedance, such as about the 250 Ohm value mentioned below) are predetermined or preselected in such way that the peak resonant current both exceeds the value of the latching current of the dimmer switch 75 at any AC value at turn on, and further is reasonably or comparatively low in order to avoid damaging dimmer switch 75 and switching power supply 130 components. For a 110 V (220 V) operating environment, one or more inductors having a combined inductance of about 16-24 mH (40-50 mH), and more particularly 18-22 mH (43-47 mH), are utilized (e.g., three inductors implementing inductor 236 at 6.8 mH each (15 mH each)), for the previously stated range of capacitance values for the filter capacitor 235, providing an overall characteristic impedance between about 200-300 Ohms, and more particularly, generally about 250 Ohms.

An exemplary second method of operating an apparatus 100, 100A-G having a switching power supply 130 and an input filter capacitor 235 (having a comparatively low capacitance, i.e., a small capacitor) during a full operation mode and when powered by a dimmer switch 75, by providing a substantially matching electrical environment to the dimmer switch 75 when it has turned on, may comprise the following sequence (FIG. 10, step 326 or both steps 324-326):

1. Monitoring resonant current after dimmer switch 75 turn on.
2. When the resonant current has reached its peak, adaptively providing a first interface mode using an adaptive interface 115 (e.g., 115E, 115F) as an additional transient path for the current to divert it from resonant charging of the filter capacitor 235 while simultaneously maintaining the dimmer switch 75 current above the holding (or latching) current threshold.
3. With the adaptive interface 115 (as an additional transient circuit) activated, driving the switching power supply 130 with the substantially maximum permissible instantaneous input power without violation of the subsequent average power consumed by the switching power supply 130 during the utility cycle as determined or set by corresponding feedback.
4. Discontinuing use of the adaptive interface 115 and transitioning to a second interface mode of the dimmer switch 75 and the switching power supply 130 at about the time the resonant inductor has discharged its stored energy or when a predetermined period of time has elapsed following the resonant current having substantially reached its peak.

Figure 15:
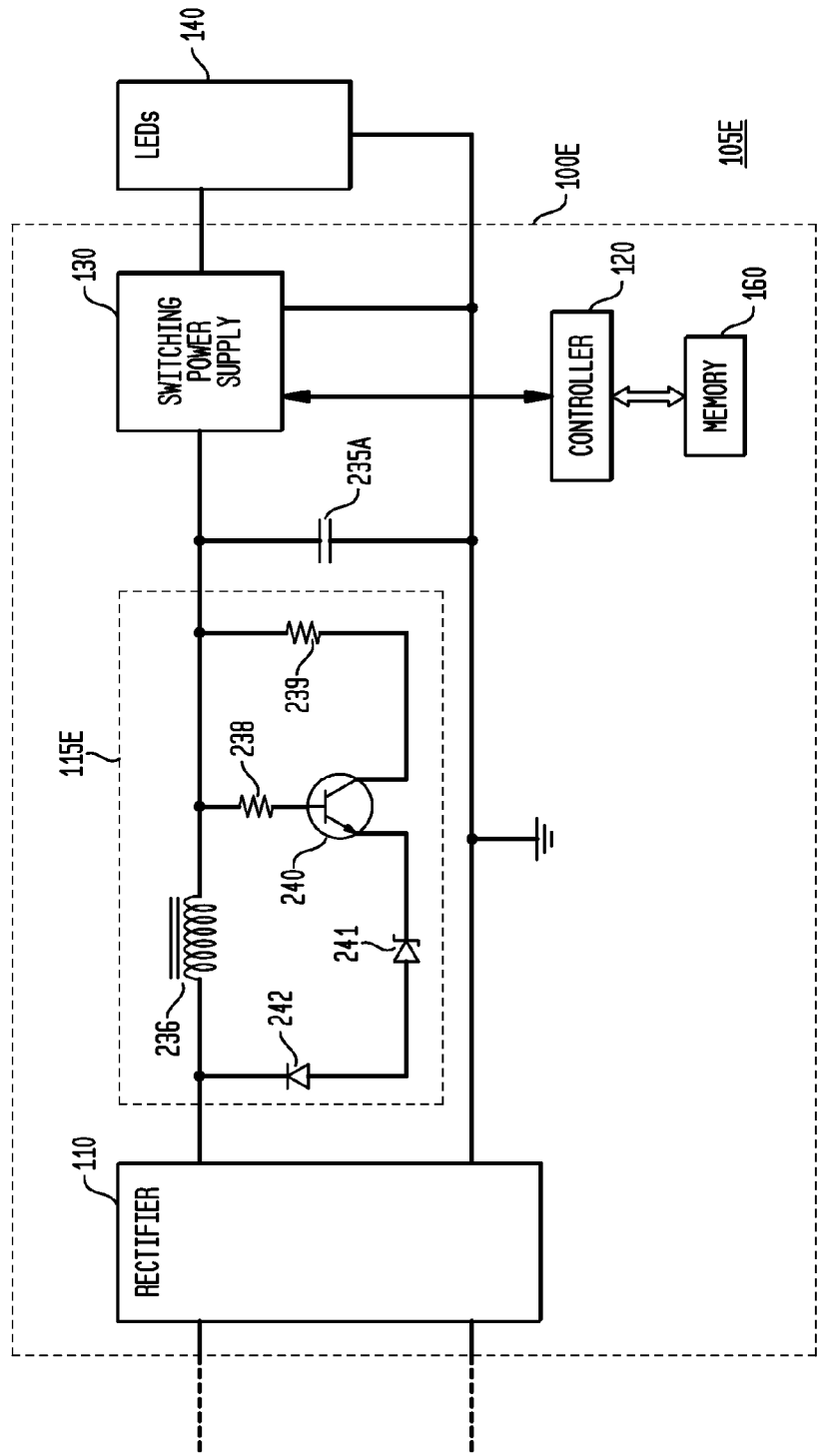
FIG. 15 is a block and circuit diagram illustrating a sixth exemplary apparatus embodiment, a sixth exemplary system embodiment, and a sixth exemplary adaptive interface embodiment in accordance with the teachings of the present disclosure.
Figure 16:
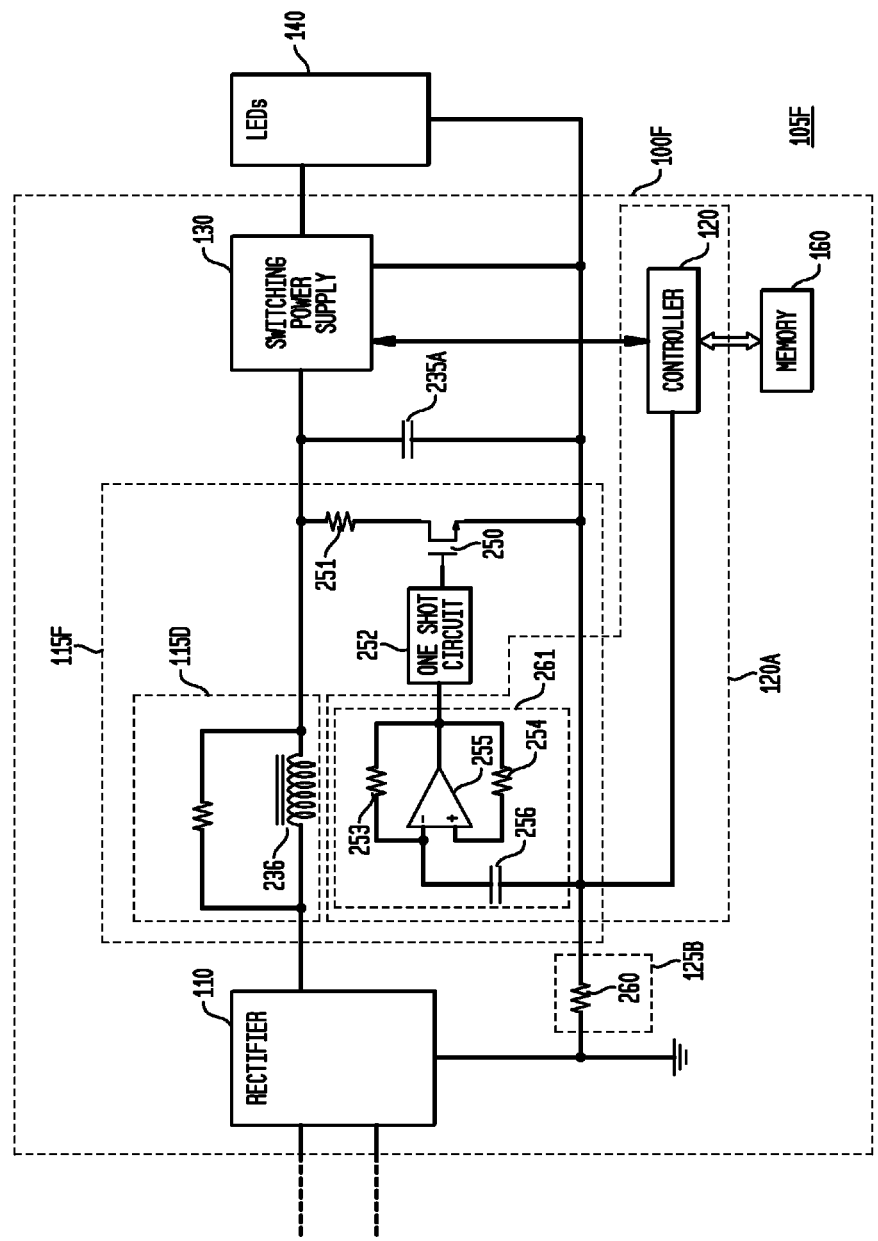
FIG. 16 is a block and circuit diagram illustrating a seventh exemplary apparatus embodiment, a seventh exemplary system embodiment, and a seventh exemplary adaptive interface embodiment in accordance with the teachings of the present disclosure.
Figure 17:
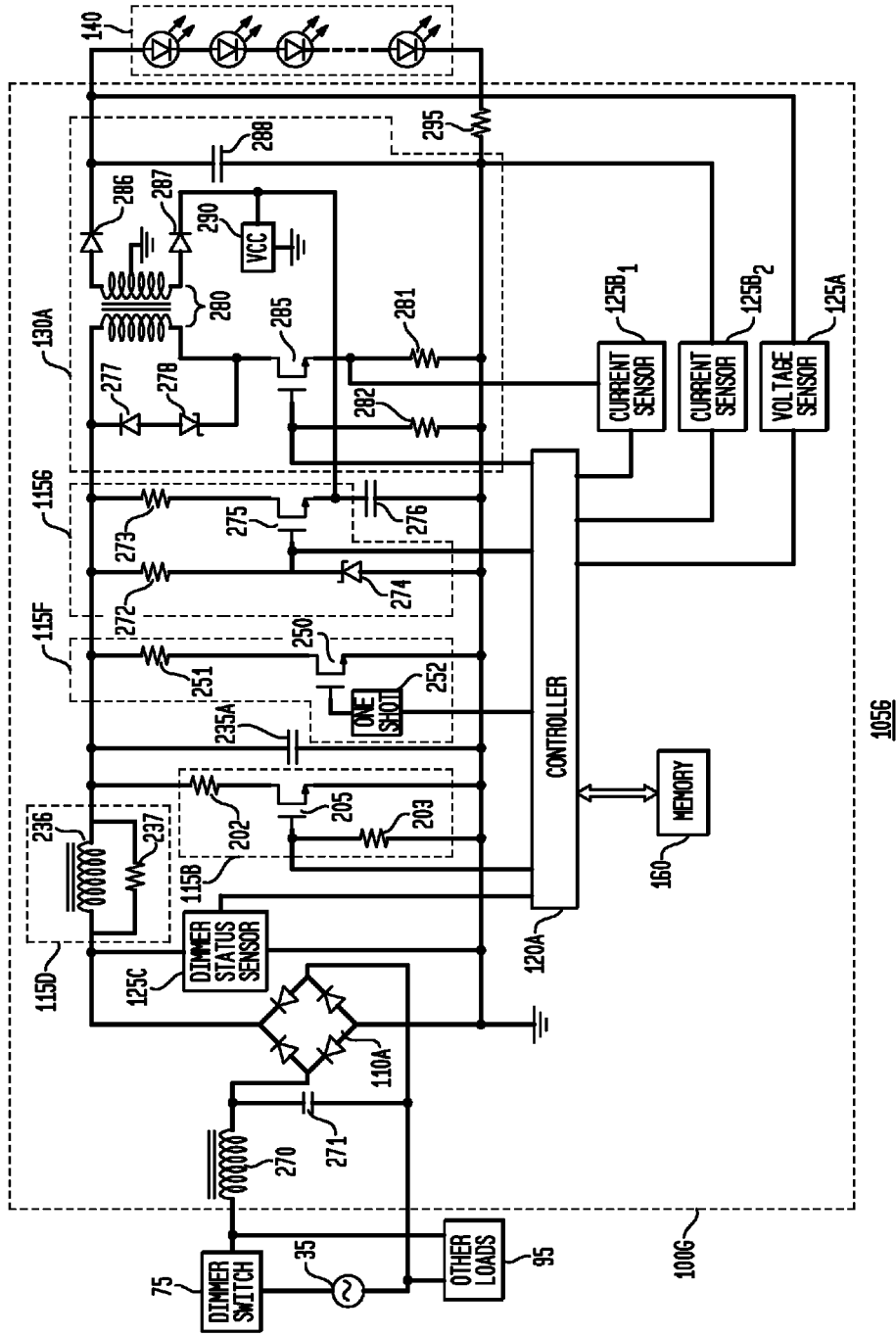
FIG. 17 is a block and circuit diagram illustrating an eighth exemplary apparatus embodiment and an eighth exemplary system embodiment in accordance with the teachings of the present disclosure.

This exemplary methodology may be implemented, for example, using the circuitry illustrated in FIGS. 15-17.

Figure 22:
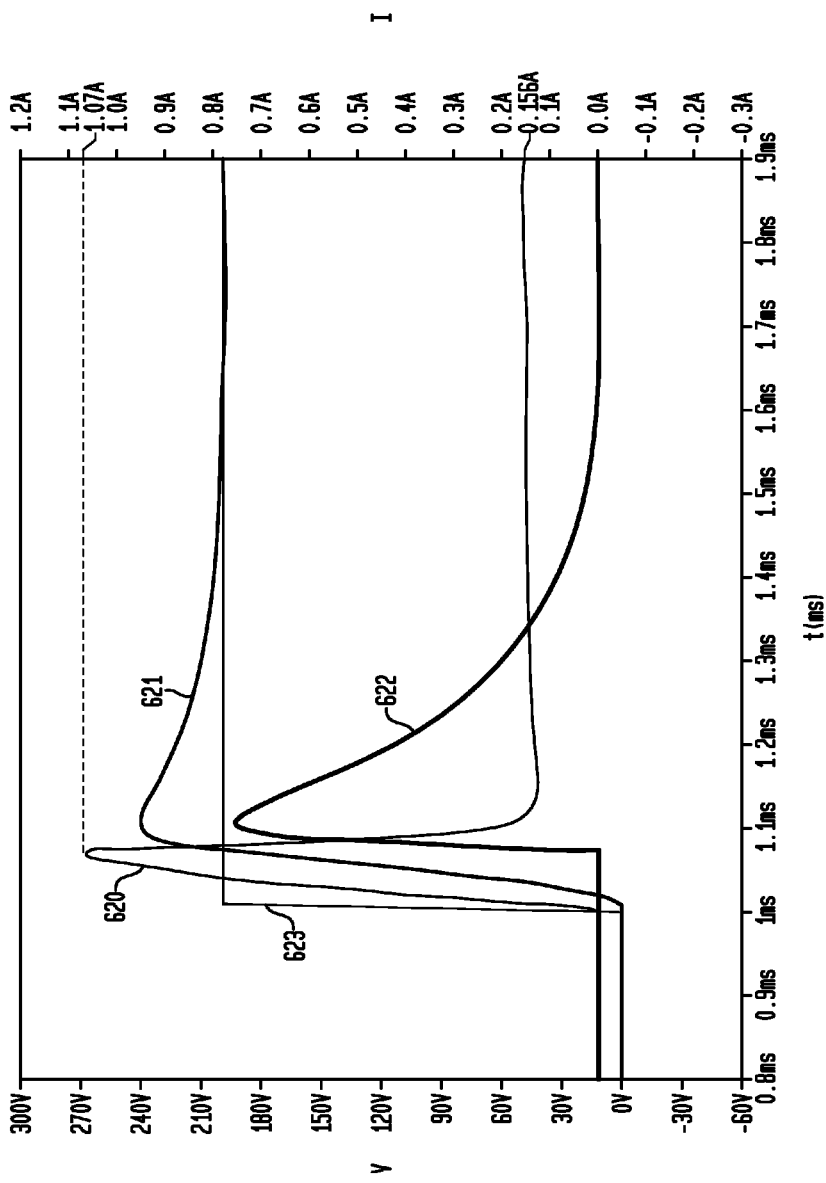
FIG. 22 is a graphical diagram illustrating exemplary, modeled transient voltage and current waveforms for a sixth exemplary apparatus embodiment, a sixth exemplary system embodiment, and a sixth exemplary adaptive interface embodiment in accordance with the teachings of the present disclosure.

FIG. 15 is a block and circuit diagram of a sixth exemplary apparatus embodiment 100E, a sixth exemplary system embodiment 105E, and a sixth exemplary adaptive interface embodiment 115E in accordance with the teachings of the present disclosure. FIG. 22 is a graphical diagram illustrating exemplary, modeled transient voltage 621 and current 620, 622 waveforms for a sixth exemplary apparatus embodiment, a sixth exemplary system embodiment, and a sixth exemplary adaptive interface embodiment in accordance with the teachings of the present disclosure. Not separately illustrated, the apparatus 100E may be coupled to a dimmer switch 75 and an AC line 35, as previously illustrated in FIGS. 8 and 9. The adaptive interface 115E implements a full operation interface circuit 220, for example and without limitation. The adaptive interface 115E comprises inductor 236, resistors 238 and 239, switch (transistor) 240, zener diode 241, and blocking diode 242. The inductor 236 and filter capacitor 235A form a resonant circuit. A transistor 240 is connected in series with the resistor 239 and diodes 241 and 242 across (in parallel with) the inductor 236. The base of transistor 240 is also connected to the inductor 236 via a resistor 238. Blocking diode 242 and zener diode 241 prevent a turning on of the transistor 240 during the non-resonant (or non-transient) switching cycles of the power supply 130. When the resonant current through the dimmer switch 75 reaches its peak, the polarity of the voltage across inductor 236 changes and transistor 240 starts conducting, providing a transient current path through resistor 239 and preventing excessive overcharge of the filter capacitor 235A. As illustrated in FIG. 22, experimental modeling (voltage waveform 621 across filter capacitor 235, modeled voltage waveform 623 provided by dimmer switch 75, current 620 through dimmer switch 75, and current 622 through transistor 240) indicates significant damping and effective elimination of any unwanted oscillation, providing substantially stable operation of the dimmer switch 75, and further provides both a maximum current of about 1.07 A and a minimum dimmer switch 75 current of about 156 mA, a value above typical minimum holding and latching current thresholds.

FIG. 16 is a block and circuit diagram of a seventh exemplary apparatus embodiment 100F, a seventh exemplary system embodiment 105F, and a seventh exemplary adaptive interface embodiment 115F in accordance with the teachings of the present disclosure. FIG. 23 is a graphical diagram illustrating exemplary, modeled transient voltage and current waveforms for a seventh exemplary apparatus embodiment, a seventh exemplary system embodiment, and a seventh exemplary adaptive interface embodiment in accordance with the teachings of the present disclosure. Not separately illustrated, the apparatus 100F may be coupled to a dimmer switch 75 and an AC line 35 as previously illustrated in FIGS. 8 and 9. The adaptive interface 115F implements a full operation interface circuit 220, for example and without limitation. The adaptive interface 115F comprises inductor 236, differentiator 261, one shot circuit 252, switch (MOSFET transistor) 250, and resistor 251. A current sensor 125B is illustrated as embodied by and comprising a current sense resistor 260, which is illustrated as providing feedback to the differentiator 261 and also optionally to the controller 120. In addition to the other control functionality of a controller 120 as discussed herein, controller 120A may further comprise a differentiator 261. A voltage generated across current sense resistor 260 may be utilized as an indicator of, for example, current through the dimmer switch 75 (not separately illustrated). Inductor 236 and input filter capacitor 235A also form a resonant circuit as discussed above. A differentiator 261 comprising operational amplifier 255, capacitor 256, and resistors 253 and 254, is connected (via capacitor 256 to its inverting input) to current sense resistor 260. The output of the differentiator 261 is coupled to a one shot circuit 252 to drive the switch (MOSFET) 250 with a resistive load 251. When the resonant current through the dimmer switch 75 reaches its peak, the differentiator 261 triggers the one shot circuit 252 which turns on switch (MOSFET) 250 for a predetermined or preselected time duration, providing an additional path for current from inductor 236, to avoid additional charging of filter capacitor 235A. The various waveforms illustrated in FIG. 23 include current waveform 630 for the current through the dimmer switch 75, voltage waveform 631 for the voltage across the filter capacitor 235A, the input AC voltage waveform 623 (when turned on by the dimmer switch 75), and the current waveform 632 for the current through the MOSFET switch 250. Experimental modeling indicates significant damping and effective elimination of any unwanted oscillation, providing substantially stable operation of the dimmer switch 75, and further may provide a minimum dimmer switch 75 current of about 100 mA, a value above typical minimum holding and latching current thresholds, with resistor 251 and switch 250 sinking about 60 mA of current for a 1 A peak current, and with the on time duration of the switch 250 (from the one shot circuit 252) being about 200 μs. Circuitry other than the one shot circuit 252 having a fixed active time duration could be substituted equivalently, such as by a variable or dynamic active time under the control of the controller 120, 120A, and those having skill in the art may use numerous adaptive timing circuits to exercise such an option.

FIG. 17 is a block and circuit diagram of an eighth exemplary apparatus embodiment 100G and an eighth exemplary system embodiment 105G in accordance with the teachings of the present disclosure. The apparatus 100G implements both a full operation interface circuit 220 (using adaptive interfaces 115D and 115F) and a combined start-up interface and gradual or soft start power interface circuit 200, 210 (using adaptive interface 115B, operating voltage bootstrap circuit 115G which also functions as an adaptive interface), for example and without limitation. In addition, through the use of the various sensors 125 and the controller 120A (including the differentiator 261 for driving the one shot circuit 252), the apparatus 100G also implements a protective mode interface circuit 230, as discussed in greater detail below. The apparatus 100G is considered exemplary of any of the various combinations of a resonant process interface circuit 195 (implemented using interface 115D), a full operation interface circuit 220, a start-up interface 200, a gradual or soft start power interface circuit 210, and a protective mode interface circuit 230, and those having skill in the electronic arts will recognize innumerable equivalent combinations which are considered within the scope of the present disclosure.

As illustrated, the apparatus 100G comprises a controller 120A, a memory 160 (e.g., registers, RAM), a plurality of sensors 125, a plurality of adaptive interface circuits 115, optional coupling inductor 270 and capacitor 271, a bridge rectifier 110A, filter capacitor 235A, bootstrap circuit 115G for fast generation of an operating voltage $V_{CC}$ (in block 290) (and bootstrap circuit 115G also serves to operate as an adaptive interface circuit 115B, as discussed below), a switching power supply 130A (illustrated as having a transformer 280 in a flyback configuration), and an optional resistance 295 (which may also function as a voltage or current sensor in exemplary embodiments). The teachings of this disclosure do not limit the topology of the apparatus 100G to the referenced flyback configuration, and any type or kind of power supply 130 configuration may be utilized, and may be implemented as known or becomes known in the electronic arts. The apparatus 100G is coupled to a dimmer switch 75 and an AC line 35 via inductor 270 and capacitor 271, which are then coupled to a bridge rectifier 110A, as an illustration of an exemplary rectifier 110 which is coupled through other components to the dimmer switch 75. The adaptive interface 115B and adaptive interface 115D function as discussed above to provide the substantially matching electrical environments to the dimmer switch 75 during start up, gradual or soft start, and full operational modes. A dimmer status sensor 125C is also illustrated, which may be implemented using any type of sensor, such as using a voltage sensor 125A as discussed above. As illustrated, a plurality of sensors 125 are utilized, in addition to the dimmer status sensor 125C, namely, two current sensors $125B_1$, $125B_2$, and voltage sensor 125A. The apparatus 100G provides power to one or more LEDs 140, which may be an array or multiple arrays of LEDs 140, of any type or color, with the apparatus 100G and LEDs 140 forming system 105G.

Exemplary embodiments or other implementations for a controller 120A and a memory 160 are described in greater detail below. The one or more sensors are utilized to sense or measure a parameter, such as a voltage or current level, and may be implemented as known or becomes known in the electronic arts. The switching power supply 130A and/or the controller 120A may and typically will receive feedback from the LEDs 140 via sensors 125A, $125B_1$, $125B_2$, as illustrated.

The adaptive interface circuits 115 of the apparatus 100G function as discussed previously. Bootstrap circuit 115G may be used both to generate an operational voltage during start up and to provide additional current sinking capability during any of the states of the dimmer switch 75. Switching of transistor 285 is utilized for delivering power to the plurality of LEDs 140 via transformer 280.

The controller 120A implements a first control method comprising two parts, a pulse width modulation (PWM) switching of the switching power supply 130A (via transistor 285), using a variable duty cycle ("D") up to a maximum duty cycle ("$D_{MAX}$"), followed by an additional operating mode, referred to as a current pulse mode, to maintain stable operation of the dimmer switch 75 and provide the appropriate dimming of the light output. The duty cycle D is determined by the controller 120 based on a detected input voltage level, so that the apparatus 100G and system 105G may accommodate a wide range of input voltages (which may vary from time to time and also both nationally and internationally, e.g., from 90 to 130 V).

The output power $P_{OUT}$ delivered by the switching power supply 130A to the LEDs 140 is equal to:

$$P_{OUT} = \frac{\pi V^2 D}{4 f L_m}$$

where

V is the RMS input voltage;

D is the Duty cycle, averaged for a half cycle of the input AC voltage;

f is the switching frequency of the power supply 130A; and $L_m$ is the magnetizing inductance of the transformer of the switching power supply 130A.

For a constant switching frequency of the power supply 130A, the duty cycle D is inversely proportional to the square of the input voltage, i.e., when voltage is increasing the duty cycle drops to deliver the same output power. Constant switching frequency is given for an example only, and a method described below is transparent to the frequency domain. Based on the output power, a maximum duty cycle $D_{MAX}$ is occurring at the minimum input voltage. As a switching power supply 130 is generally designed with a predetermined or otherwise certain maximum duty cycle for a stable operation of its magnetic components, the maximum duty cycle $D_{MAX}$ is predetermined or preselected at minimum input voltage. When the output of the switching power supply 130 is controlled by a dimmer switch 75, the controller 120 is configured to have an average duty cycle based on an average input voltage regulated by the dimmer switch 75.

The following is an example to illustrate the insight of the present disclosure which introduces two separate control methodologies, without relying solely on control through PWM as typically found in the prior art, in addition to independently controlling the amount of current through the dimmer switch 75 to maintain stable operation. As an example, at an input voltage of 90V RMS (Average 81 V), a $D_{MAX}$=0.6 is selected at a phase angle α=0. It should be noted that the maximum volt-seconds ("voltsecs") to magnetize the magnetic components (280) will happen at the crest of the input voltage. In the event that the input voltage is or becomes 130 VRMs (average 120 V), the duty cycle developed, determined, or otherwise calculated by the controller 120 decreases to D=0.29, and as for the same magnetizing voltsecs at the crest of 130 V the duty cycle is D=0.415. As a consequence, working with D=0.415 is safe or otherwise appropriate for the magnetic components of the transformer 280. Assuming for this example that, at 130 V, the phase modulation then introduced by the dimmer switch 75 is α=90°. The average input voltage will be 60V and controller 120 will generate a maximum possible duty cycle D=$D_{MAX}$=0.6 to compensate for the lower input voltage. However, from the power supply 130A point of view, the magnetizing voltage at the crest still will be an amplitude of input voltage for which we calculated the maximum permissible duty cycle as D=0.415. The power supply 130A would then be forced to work at the crest with an elevated duty cycle D=0.6 instead of D=0.415, which could mean the saturation of the magnetic components (280) and power supply 130 failure. Accordingly, recognizing that PWM alone will not accomplish the desired stability under dimming conditions, to both draw sufficient current for proper dimmer operation and provide the desired lighting output, the exemplary embodiments provide another, second control mechanism for powering a switching power supply 130 from a dimmer switch 75 for a stable interface of the dimmer switch 75 and switching power supply 130.

A first control method is based on adjustment of the duty cycle based on average input voltage with maximum average duty cycle $D_{MAX}$ preselected at minimum input voltage and stored in the controller 120A (or its memory or memory 160). For that predetermined or preselected $D_{MAX}$ value, another maximum parameter of the switching power supply 130 is predetermined or otherwise preselected, namely, the maximum volt-seconds ("$VSEC_{MAX}$") at the crest or peak of the minimum input voltage and stored in the controller 120 (or its memory or memory 160). In accordance with various exemplary embodiments, the switching power supply 130A is enabled to operate using a range of input voltages, while the operational duty cycle is maintained below $D_{MAX}$ and the same operational volt-seconds are kept below maximum stored volt-seconds $VSEC_{MAX}$. Accordingly, the switching power supply 130A operates with a potentially constant or adjustable duty cycle to generate a high power factor and it further switches to the volt-seconds limit whenever the duty cycle is excessive (i.e., within a predetermined range of $D_{MAX}$) for the maximum preselected value of volt-seconds $VSEC_{MAX}$. Implementation of this second inventive regulation mechanism of the first control method may be done by measuring input voltage and integrating it (e.g., within the controller 120A, using an integrator, not separately illustrated) during the on time of the switch 285 of the switching power supply 130A (and volt-seconds may also be obtained through a feed forward technique, not shown on FIG. 17). It also can be implemented by a switch current measurement, Ipeak control, using sensor 125B$_1$ illustrated in FIG. 17. Rather than using a maximum volt-seconds $VSEC_{MAX}$ parameter, another alternative control methodology for the second tier of this two-tiered control methodology will utilize a peak current level ("$I_P$") parameter, either the peak current level of the primary inductor of transformer 280 or the output peak current level, to adjust the power provided to LEDs 140 under dimming conditions.

Figure 18:
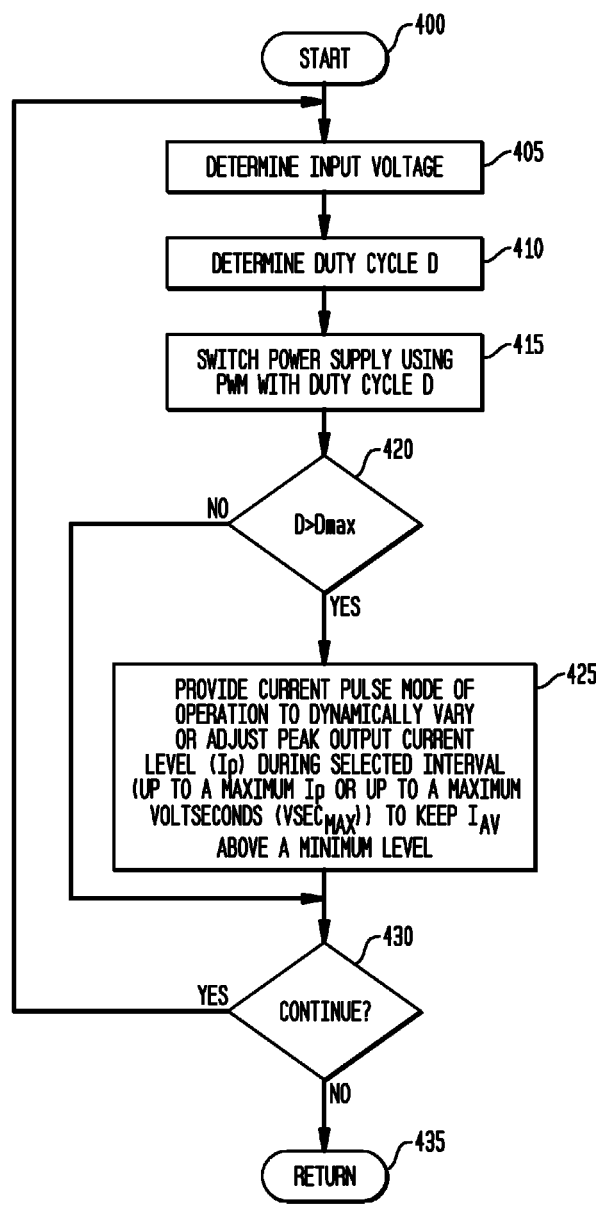
FIG. 18 is a flow diagram illustrating a second exemplary method embodiment in accordance with the teachings of the present disclosure.

FIG. 18 is a flow diagram of a second exemplary method embodiment in accordance with the teachings of the present disclosure, and provides a useful explanation and summary of the two-tiered control methodology, using either the maximum volt-seconds $VSEC_{MAX}$ parameter or the peak current level ("$I_P$") parameter. Beginning with start step 400, the method determines an input voltage, step 405. Using the determined or sensed input voltage, the method determines a duty cycle D for pulse width modulation, step 410, which is less than (or equal to) the maximum duty cycle $D_{MAX}$, to provide the selected or predetermined average output current level, $I_{AV}$. The switching power supply is then switched using the duty cycle D, step 415, providing the selected or predetermined average output current level, $I_{AV}$. The method then determines whether the duty cycle D is within a predetermined range of (or substantially equal to) the maximum duty cycle $D_{MAX}$, step 420, and if so, transitions to current pulse mode (step 425), and if not, and the method is to continue (step 430), iteratively returns to step 405, adjusting the duty cycle D as may be needed based on the sensed input voltage to provide the selected or predetermined average output current level, $I_{AV}$, and continuing to provide PWM for the switching power supply 130, 130A. When the duty cycle D is within the predetermined range of (or substantially equal to) the maximum duty cycle $D_{MAX}$, current pulse mode is implemented, step 425, providing a current pulse with a dynamically adjustable or varying peak current $I_P$ (either the peak current level of the primary inductor of transformer 280 or the output peak current level), to increase the output current level during a selected interval, up to a maximum peak current level ("$I_{MAX}$"), to maintain the output current (usually the selected or predetermined average output current level, $I_{AV}$) above a predetermined or selected minimum level, to maintain sufficient current for the LEDs 140 to emit light, and simultaneously allow a dimming effect. Alternatively, in step 425, current pulse mode is also implemented, step 425, providing a current pulse with a dynamically adjustable or varying peak current $I_P$ (either the peak current level of the primary inductor of transformer 280 or the output peak current level), to increase the output current level during a selected interval, up to a maximum volt-seconds $VSEC_{MAX}$ parameter, to maintain the output current (usually the selected or predetermined average output current level, $I_{AV}$) above a predetermined or selected minimum level, to maintain sufficient current for the LEDs 140 to emit light, and simultaneously allow a dimming effect. When the method is to continue, step 430, the method returns to step 405 and iterates, and otherwise, the method may end, return step 435.

The duty cycle control, peak current control, and/or maximum volt-seconds $VSEC_{MAX}$ control is implemented by the controller 120, 120A, which may dynamically increase or decrease the duty cycle D to maintain a selected or predetermined average output current ("$I_{AV}$"), up to the maximum duty cycle $D_{MAX}$. Accordingly, if or when the apparatus 100 (and any of its variations 100A-100G) and system 105 (and any of its variations 105A-105G) is coupled to a dimmer switch 75 and the user adjusts the dimmer switch to provide dimming, the duty cycle is dynamically adjusted and increased up to the maximum duty cycle $D_{MAX}$, after which point the average output current to LEDs 140 may begin to decrease, and the output light emission is dimmed. The controller 120, 120A, however, will transition to the additional, current pulse mode, and maintain the allowable peak current (amplitude) (i.e., up to a predetermined or selected maximum peak current or maximum volt-seconds $VSEC_{MAX}$ parameter) to support sufficient current to the LEDs 140 such that light continues to be provided, and does not become so low that the LEDs 140 effectively shut off and stop emitting light. In these various embodiments, a dimmer switch 75 is automatically accommodated, without any need for additional or separate detection of such a dimmer. A significant advantage of the first control method is that no additional current is utilized and, therefore, there are no additional corresponding power losses as found in the prior art.

The controller 120, 120A also functions as an adaptive interface (circuit 230) to implement the protective mode of operation. Using any of the various sensors 125, the controller may determine that while there is incoming power from a dimmer switch 75 or other switch, for example and without limitation, the output current (e.g., through the LEDs) is too high (e.g., indicative of a short circuit), or too low or nonexistent (indicative of an open circuit), or may detect other faults within any of the other various components. In these circumstances, the controller 120, 120A may provide a low power mode, taking sufficient power to maintain an on-state of circuitry such as the controller 120, or may determine to shut down the apparatus 100, 100A-G, and/or the switching power supply 130 completely.

Figure 19:
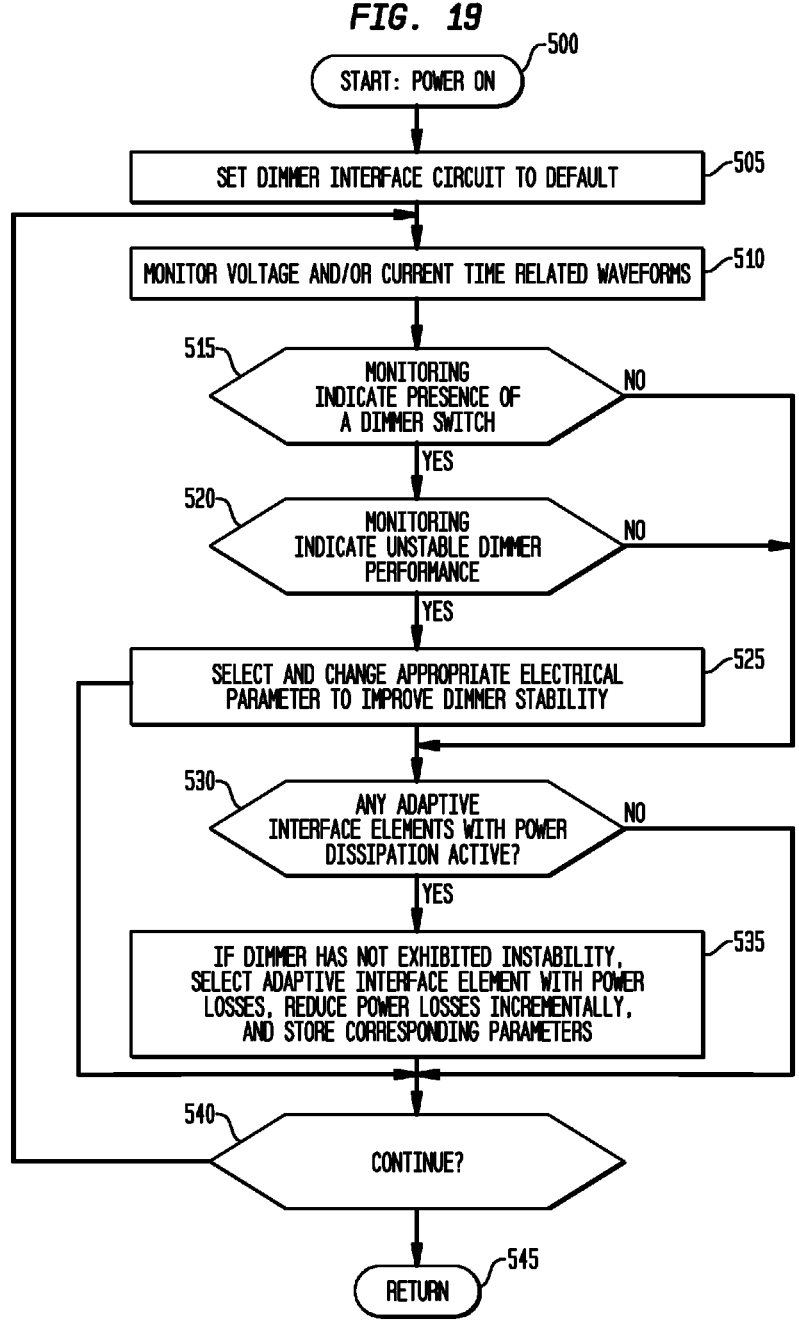
FIG. 19 is a flow diagram illustrating a third exemplary method embodiment in accordance with the teachings of the present disclosure.

FIG. 19 is a flow diagram of a third exemplary method embodiment in accordance with the teachings of the present disclosure, by keeping the dimmer switch 75 operating stably but just at the edge or border of potentially becoming unstable, such as by having flicker or other triggering issues. For example, and as illustrated above in FIGS. 6 and 7, there are a wide variety of types of dimmer instability or improper performance, such as (without limitation): (1) the dimmer switch 75 does not turn on within a half cycle of AC (35) being provided; (2) the dimmer switch 75 turns on more than one time within a half cycle of the AC (35); (3) following a zero crossing and conducting, a forward dimmer switch 75 does not turn off at a next AC line voltage zero crossing; (4) a reverse dimmer switch 75 does not turn on following the first AC zero crossing; (5) the phase angle α is changing from one half cycle to another with different signs of changes, suggestive of the existence of oscillations. Stable operation of a dimmer switch 75 may be characterized using opposing criteria, such as (without limitation): (1) the dimmer switch 75 turns on once during each half cycle; (2) the dimmer switch 75 turns off (on) at AC zero crossings; and/or (3) the phase angle α is changing monotonically. Using any of the various sensors 125, the controller 120 may be utilized to detect any of these features of improper or proper operation, such as using a voltage sensor 125A to detect the voltage changes indicative of the dimmer switch 75 turning on multiple times during a half cycle, or not turning off at the appropriate time, for example and without limitation.

Referring to FIG. 19, the method begins, start step 500, with the system 105 being powered on, such as by applying AC voltage 35 to the dimmer switch 75, and with adaptive interface circuits 115 set to their default levels as discussed above, step 505, such that sufficient current levels are drawn through the dimmer switch 75. Voltage or current levels are monitored, step 510. When the voltage or current levels indicate the presence of a dimmer switch, step 515, the method determines whether the dimmer switch is functioning properly or improperly, such as by detecting the presence of flicker, step 520. For example, a dimmer switch 75 may be present and also functioning properly, due to, for example, the presence of other loads in parallel with the system 105, with sufficient current being drawn by all of the loads to maintain proper operation of the dimmer switch 75. Further, different dimmer switches 75 may function improperly (or properly) at different holding or latching currents, such that some dimmer switches 75 may function properly and others improperly for the same LEDs 140 and, therefore, it may be necessary or desirable to detect flickering. Accordingly, when the method determines that the dimmer switch 75 is functioning improperly in step 520, such as by detecting the presence of flicker, the method regulates the current from the dimmer switch 75 during selected intervals, step 525, such as through control of any of the various adaptive interface circuits discussed above, and also as discussed below.

Another alternative may be utilized to diminish power consumption. When no dimmer switch 75 is present in step 515, or is functioning properly in step 520, the controller 120 may be utilized to decrease the current (and power) drawn by the adaptive interface circuits 115 in their default modes, determining whether any adaptive interface circuits 115 with power dissipation are active, step 530. If so, and if the dimmer switch 75 has not exhibited instability, an active adaptive interface circuit 115 may be selected, its current parameters stored in memory 160 (and returned to if the dimmer switch 75 subsequently exhibits instability), and its power dissipation reduced, step 535, such as by reducing the amount of current through an adaptive interface circuit 115B, with these parameters stored as next parameters in memory 160, for example. The method then returns to step 205 and iterates, continuing to monitor voltage and/or current levels and provide current regulation accordingly. Following steps 525, 530, or 535, when the method is to continue (step 540), the method returns to step 510 and iterates, continuing to monitor voltage and/or current levels and provide current regulation accordingly, and otherwise (such as when the system 105 is turned off) the method may end, return step 545.

For example, in this exemplary methodology, using dimmer status sensor 125C or a voltage sensor 125A, the exemplary apparatus 100G detects the presence of a dimmer switch 75. When a dimmer switch 75 is detected, the controller 120 and one or more adaptive interface circuits (e.g., 115B and 115D or any other of the illustrated interface circuits) provide one or more of the following substantially matching electrical environments to the dimmer switch 75: (1) a small matching impedance to the dimmer switch 75 triggering circuit, using adaptive interface circuit 115B controlled by controller 120; (2) supports greater than holding current of the dimmer switch 75 when the bootstrap circuit 115G is active and charging a $V_{CC}$ capacitor (290), which thereby also constitutes an adaptive interface circuit 115 controlled by controller 120; (3) adjusts minimum power from the dimmer switch 75 at gradual or soft start of the switching power supply 130, also using adaptive interface circuit 115B controlled by controller 120; (4) provides a matching small impedance to the dimmer switch 75 triggering circuit by keeping the duty cycle D (of the switching power supply 130) close to 1, also under control of the controller 120; and/or (5) shaping the current of the dimmer switch 75 in the resonant process, using one or more of adaptive interface circuits 115D, 115E, 115F.

The controller 120, which may be embodied using one or a plurality of controllers or other comparable circuits, is typically configured to compare the sensed output voltage and current levels to corresponding predetermined voltage and current values, which may be programmed and stored in memory 160, or which may be obtained from memory 160 (such as through a look up table) based upon other sensed values, such as sensed input voltage levels. Following such comparisons, an error signal or error level is determined, such as a difference between the sensed and predetermined levels, and corresponding feedback provided, such as to increase or decrease output voltage or current levels, in a first mode, through modulating the on-time (on-time pulse width) of the power switch 285 at a selected switching frequency, or at a variable switching frequency, which is generally at a substantially higher frequency than the AC line frequency, and in a second mode, by modulating the peak current levels.

Several novel features are implemented in the apparatus 100 (and any of its variations 100A-100G), system 105 (and any of its variations 105A-105G), and controller 120 embodiments. First, the adaptive interface circuits 115 independently enable operation with a phase-modulated dimmer switch 75, without unwanted flicker and premature start-up problems of the prior art. Second, the adaptive interface circuits 115 provide control based on a combination of both the state of the dimmer switch 75 and the state of the switching power supply 130. Third, a resonant mode is introduced with input current shaping or control during dimmer switch 75 turn on. Fourth, a PWM control is implemented, as a first part of a two-part control method, having a dynamic and adjustable maximum duty cycle $D_{MAX}$, based or dependent on the (sensed) input voltage, having a theoretical dynamic range of zero to one hundred eighty degrees, and accommodating a wide range of potentially varying input voltages. Fifth, a current pulse mode is implemented, as a second part of the two-part control method, having a variable and dynamically adjustable peak current level, for either the primary inductor peak current level or the output peak current level, or up to a maximum volt-seconds $VSEC_{MAX}$ parameter.

Additional advantages of the exemplary embodiments are readily apparent. The exemplary embodiments allow for solid state lighting, such as LEDs, to be utilized with the currently existing lighting infrastructure and to be controlled by any of a variety of switches, such as phase-modulating dimmer switches, which would otherwise cause significant operation problems. The exemplary embodiments further allow for sophisticated control of the output brightness or intensity of such solid state lighting, and may be implemented using fewer and comparatively lower-cost components. In addition, the exemplary embodiments may be utilized for stand-alone solid state lighting systems, or may be utilized in parallel with other types of existing lighting systems, such as incandescent lamps. The exemplary embodiments essentially may work with any high impedance load and/or anything drawing comparatively low current through a dimmer switch.

The various methodologies described above may also be combined in additional ways. For example, dimmer detection is not required, and instead a series element may be programmed to switch at predetermined intervals to accommodate a dimmer switch, or also as described above with reference to FIGS. 9 and 10, switching duty cycles may be determined from input parameters, such as sensed input voltage levels. In addition, when dimmer detection may be utilized, different strategies are available, such as blocking current to prevent capacitors from charging, such as through a series current control element, or providing current bypassing, such as through an adaptive current control element.

A wide variety of control methodologies and alternative adaptive interface circuits 115 have been illustrated to implement the proposed method of interfacing of a dimmer switch and switching power supply by modulating dimmer current and further by shaping dimmer current in a resonant process. The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Those having skill in the electronic arts will recognize that the various single-stage or two-stage converters may be implemented in a wide variety of ways, in addition to those illustrated, such as flyback, buck, boost, and buck-boost, for example and without limitation, and may be operated in any number of modes (discontinuous current mode, continuous current mode, and critical conduction mode).

Reference throughout this specification to "one embodiment," "an embodiment," or a specific "embodiment" means that a particular feature, structure, or characteristic described in connection with the embodiment is included in at least one embodiment of the present disclosure and not necessarily in all embodiments, and further, are not necessarily referring to the same embodiment. Furthermore, the particular features, structures, or characteristics of any specific embodiment of the disclosure may be combined in any suitable manner and in any suitable combination with one or more other embodiments, including the use of selected features without corresponding use of other features. In addition, many modifications may be made to adapt a particular application, situation, or material. It is to be understood that other variations and modifications of the embodiments described and illustrated herein are possible in light of the teachings herein.

It will also be appreciated that one or more of the elements depicted in the Figures can also be implemented in a more separate or integrated manner, or even removed or rendered inoperable in certain cases, as may be useful in accordance with a particular application. Integrally formed combinations of components are possible. In addition, use of the term "coupled" herein, including in its various forms such as "coupling" or "couplable," means and includes any direct or indirect electrical, structural, or magnetic coupling, connection or attachment, or adaptation or capability for such a direct or indirect electrical, structural, or magnetic coupling, connection, or attachment, including integrally formed components and components which are coupled via or through another component.

As used herein for purposes of the present disclosure, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light-emitting polymers, organic LEDs, and so on, including within the visible spectrum, or other spectra such as ultraviolet or infrared, of any bandwidth, or of any color or color temperature.

A "controller" or "processor" may be any type of controller or processor, and may be embodied as one or more controllers, configured, designed, programmed, or otherwise adapted to perform the functionality discussed herein. As the term controller or processor is used herein, a controller or processor may include use of a single integrated circuit ("IC"), or may include use of a plurality of integrated circuits or other components connected, arranged, or grouped together, such as controllers, microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term controller (or processor) should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM or $E^2$PROM. A controller (or processor) (such as controller 120), with its associated memory, may be adapted or configured (via programming, FPGA interconnection, or hard-wiring) to perform the methodology, as discussed below. For example, the methodology may be programmed and stored, in a controller 120 with its associated memory (and/or memory 160) and other equivalent components, as a set of program instructions or other code (or equivalent configuration or other program) for subsequent execution when the processor is operative (i.e., powered on and functioning). Equivalently, when the controller 120 is implemented in whole or part as FPGAs, custom ICs and/or ASICs, the FPGAs, custom ICs or ASICs also may be designed, configured and/or hard-wired to implement described methodology. For example, the controller 120 may be implemented as an arrangement of controllers, microprocessors, DSPs and/or ASICs, collectively referred to as a "controller," which are respectively programmed, designed, adapted, or configured to implement described methodology, in conjunction with a memory 160.

The memory 160, which may include a data repository (or database), may be embodied in any number of forms, including within any computer or other machine-readable data storage medium, memory device, or other storage or communication device for storage or communication of information, currently known or which becomes available in the future, including, but not limited to, a memory integrated circuit ("IC"), or memory portion of an integrated circuit (such as the resident memory within a controller 120 or processor IC), whether volatile or non-volatile, whether removable or non-removable, including without limitation, RAM, FLASH, DRAM, SDRAM, SRAM, MRAM, FeRAM, ROM, EPROM, or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. In addition, such computer-readable media includes any form of communication media which embodies computer-readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on. The memory 160 may be adapted to store various look up tables, parameters, coefficients, other information and data, programs, or instructions, and other types of tables such as database tables.

As indicated above, the controller 120 is programmed, using software and data structures, for example, to perform described methodology. Technology described herein may be embodied as software which provides such programming or other instructions, such as a set of instructions and/or metadata embodied within a computer-readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code, or metadata may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 120, for example).

The software, metadata, or other source code and any resulting bit file (object code, database, or look up table) may be embodied within any tangible storage medium, such as any of the computer or other machine-readable data storage media, as computer-readable instructions, data structures, program modules, or other data, such as discussed above with respect to the memory 160, e.g., a floppy disk, a CD-ROM, a CD-RW, a DVD, a magnetic hard drive, an optical drive, or any other type of data storage apparatus or medium, as mentioned above.

In the foregoing description and in the Figures, sense resistors are shown in exemplary configurations and locations; however, those skilled in the art will recognize that other types and configurations of sensors may also be used and that sensors may be placed in other locations. Alternate sensor configurations and placements are within the scope of the disclosure.

As used herein, the term "DC" denotes both fluctuating DC (such as is obtained from rectified AC) and constant voltage DC (such as is obtained from a battery, voltage regulator, or power filtered with a capacitor). As used herein, the term "AC" denotes any form of alternating current with any waveform (sinusoidal, sine squared, rectified sinusoidal, square, rectangular, triangular, sawtooth, irregular, etc.) and with any DC offset and may include any variation such as chopped or forward- or reverse-phase modulated alternating current, such as from a dimmer switch.

With respect to sensors, we refer herein to parameters that "represent" a given metric or are "representative" of a given metric, where a metric is a measure of a state of at least part of the regulator or its inputs or outputs. A parameter is considered to represent a metric if it is related to the metric directly enough that regulating the parameter will satisfactorily regulate the metric. For example, the metric of LED current may be represented by an inductor current because they are similar and because regulating an inductor current satisfactorily regulates LED current. A parameter may be considered to be an acceptable representation of a metric if it represents a multiple or fraction of the metric. It is to be noted that a parameter may physically be a voltage and yet still represent a current value. For example, the voltage across a sense resistor "represents" current through the resistor.

In the foregoing description of illustrative embodiments and in attached figures where diodes are shown, it is to be understood that synchronous diodes or synchronous rectifiers (for example, relays, MOSFETs, or other transistors switched off and on by a control signal) or other types of diodes may be used in place of standard diodes within the scope of the present disclosure. Exemplary embodiments presented here generally generate a positive output voltage with respect to ground; however, the teachings of the present disclosure apply also to power converters that generate a negative output voltage, where complementary topologies may be constructed by reversing the polarity of semiconductors and other polarized components.

For convenience in notation and description, transformers such as transformer 280 are referred to as a "transformer," although in illustrative embodiments, it behaves in many respects also as an inductor. Similarly, inductors can, under proper conditions, be replaced by transformers. We refer to transformers and inductors as "inductive" or "magnetic" elements, with the understanding that they perform similar functions and may be interchanged within the scope of the present disclosure.

Furthermore, any signal arrows in the drawings/Figures should be considered only exemplary, and not limiting, unless otherwise specifically noted. Combinations of components of steps will also be considered within the scope of the present disclosure. The disjunctive term "or," as used herein and throughout the claims that follow, is generally intended to mean "and/or," having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications, and substitutions are intended and may be effected without departing from the spirit and scope of the disclosure. It is to be understood that no limitation with respect to the specific methods and apparatus illustrated herein is intended or should be inferred. It is, of course, intended to cover by the appended claims all such modifications as fall within the scope of the claims.

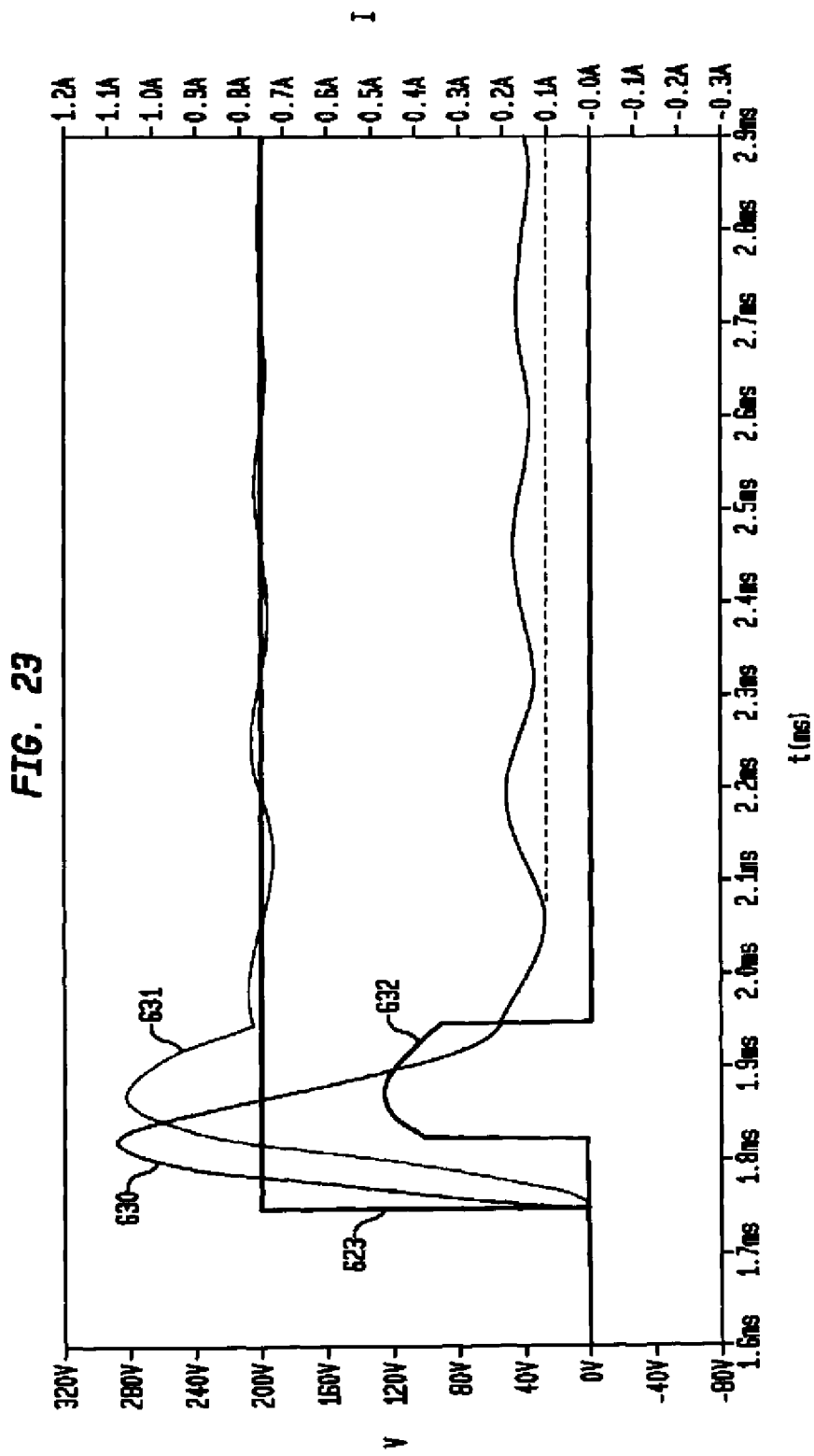

The invention claimed is:

1. A method of interfacing a switching power supply to a first switch coupled to an alternating current (AC) power source for providing power to solid state lighting, the method comprising:
    sensing an input current level;
    sensing an input voltage level;
    using a first adaptive interface circuit, providing a resistive impedance to the first switch, wherein the first adaptive interface circuit includes a resistor and a second switch configured to provide a low impedance to the first switch in a default mode and to conduct current from the first switch; and
    using a second adaptive interface circuit, when the first switch initially turns on, creating a resonant process of the switching power supply and providing a current path during the resonant process,
    wherein current flow through the second switch is modulated based on the sensed input current level or the sensed input voltage level.

2. The method of claim 1, wherein the first switch is a phase-modulated dimmer switch.

3. The method of claim 1, further comprising:
    using the second adaptive interface circuit to modulate a current of the first switch during the resonant process of the switching power supply.

4. The method of claim 1, further comprising:
    using a third adaptive interface circuit to modulate a current of the first switch during the resonant process of the switching power supply.

5. The method of claim 1, further comprising:
    using the first adaptive interface circuit to conduct current during a start up state or a gradual start state of the switching power supply.

6. The method of claim 5, further comprising:
    using the first adaptive interface circuit to conduct current during charging of a trigger capacitor of the first switch, during turn on of the first switch, and during conduction of the first switch.

7. The method of claim 1, wherein said providing a resistive impedance to the first switch comprises:
    using a controller, switching the first adaptive interface circuit to provide a constant resistive impedance to the first switch.

8. The method of claim 1, wherein said providing a resistive impedance to the first switch comprises:
    using a controller, modulating the first adaptive interface circuit to provide a variable resistive impedance to the first switch.

9. The method of claim 1, wherein said providing a current path during the resonant process comprises:
    using a controller, determining a peak input current level; and
    using the controller, switching the resistive impedance to create the current path.

10. The method of claim 1, wherein said providing a current path during the resonant process comprises:
    using a controller, determining a peak input current level; and
    using the controller, modulating a switched, resistive impedance to create the current path.

11. The method of claim 1, further comprising:
    during a full power mode of the switching power supply and during charging of a trigger capacitor of the first switch, operating the switching power supply at a one-hundred percent duty cycle or in a DC mode.

12. The method of claim 1, further comprising:
during a full power mode of the switching power supply and during turning on of the first switch, operating the switching power supply at a substantially maximum instantaneous power for a predetermined period of time.

13. The method of claim 1, wherein the second adaptive interface circuit comprises an inductor in parallel with a resistor, and wherein the method further comprises:
during a full power mode of the switching power supply and during turning on of the first switch, operating the switching power supply at a substantially maximum instantaneous power until the inductor has substantially discharged.

14. The method of claim 1, further comprising:
using the second adaptive interface circuit to conduct current during a full operational power state of the switching power supply.

15. The method of claim 1, further comprising:
adjusting a minimum power from the first switch during a gradual start phase of the switching power supply.

16. The method of claim 1, wherein the second adaptive interface circuit further comprises a switchable resistive impedance, and wherein the method further comprises:
using the second adaptive interface circuit to provide a current path during a start up phase of the switching power supply, during a gradual start up of the switching power supply, or during a full operational mode of the switching power supply.

17. The method of claim 1, further comprising:
using an operational voltage bootstrap circuit coupled to the switching power supply to generate an operational voltage.

18. The method of claim 17, wherein the first adaptive interface circuit further comprises the operational voltage bootstrap circuit.

19. The method of claim 1, further comprising:
using a controller, detecting a malfunction of the first switch.

20. A method of interfacing a switching power supply to a first switch coupled to an alternating current (AC) power source for providing power to solid state lighting, the method comprising:
sensing an input current level;
sensing an input voltage level;
using a first adaptive interface circuit, providing a resistive impedance to the first switch and conducting current from the first switch in a default mode; and
using a second adaptive interface circuit, when the first switch initially turns on, creating a resonant process of the switching power supply and providing a current path during the resonant process,
wherein said providing a resistive impedance to the first switch includes:
building an operational voltage; and
when the operational voltage has reached a predetermined level, modulating the first adaptive interface circuit and transitioning to a gradual start of the switching power supply asynchronously to the state of the first switch.

21. A method of interfacing a switching power supply to a first switch coupled to an alternating current (AC) power source for providing power to solid state lighting, the method comprising:
sensing an input current level;
sensing an input voltage level;
using a first adaptive interface circuit, providing a resistive impedance to the first switch and conducting current from the first switch in a default mode;
using a second adaptive interface circuit, when the first switch initially turns on, creating a resonant process of the switching power supply and providing a current path during the resonant process;
using a controller, determining a maximum duty cycle corresponding to the sensed input voltage level;
using the controller, providing a pulse width modulation operating mode for the switching power supply using a switching duty cycle less than the maximum duty cycle; and
using the controller, when the switching duty cycle is within a predetermined range of the maximum duty cycle, providing a current pulse operating mode for the switching power supply.

22. The method of claim 21, further comprising:
determining or obtaining from a memory the maximum duty cycle corresponding to the sensed input voltage level.

23. The method of claim 21, further comprising:
determining or varying the switching duty cycle to provide a predetermined or selected average or peak output current level.

24. The method of claim 21, further comprising:
determining a peak output current level up to a maximum voltseconds parameter.

25. A method of interfacing a switching power supply to a first switch coupled to an alternating current (AC) power source for providing power to solid state lighting, the method comprising:
sensing an input current level;
sensing an input voltage level;
using a first adaptive interface circuit, providing a resistive impedance to the first switch and conducting current from the first switch in a default mode;
using a second adaptive interface circuit, when the first switch initially turns on, creating a resonant process of the switching power supply and providing a current path during the resonant process; and
using a controller, detecting a malfunction of the first switch by determining at least two input voltage peaks or two input voltage zero crossings during a half-cycle of the AC power source.

* * * * *

UNITED STATES PATENT AND TRADEMARK OFFICE
CERTIFICATE OF CORRECTION

PATENT NO. : 8,441,210 B2
APPLICATION NO. : 12/639255
DATED : May 14, 2013
INVENTOR(S) : Shteynberg et al.

It is certified that error appears in the above-identified patent and that said Letters Patent is hereby corrected as shown below:

In the Drawings

In Fig. 23, Sheet 20 of 20, delete " 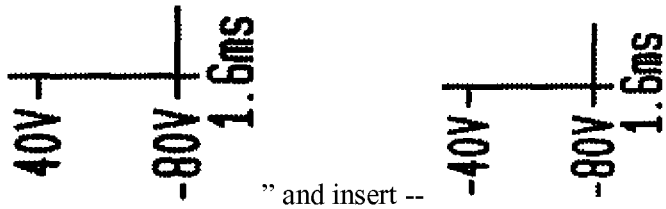 " and insert -- -- , therefor.
(As shown on the attached sheet)

In the Specification

In Column 11, Line 12, delete "50 mA-100 mA)" and insert -- 50 mA~100 mA) --, therefor.

Signed and Sealed this
Twenty-fifth Day of February, 2014

Michelle K. Lee
*Deputy Director of the United States Patent and Trademark Office*